(12) United States Patent
Huang

(10) Patent No.: US 9,277,152 B2
(45) Date of Patent: Mar. 1, 2016

(54) PHOTOGRAPHING OPTICAL LENS ASSEMBLY, IMAGE CAPTURING UNIT AND MOBILE DEVICE

(71) Applicant: LARGAN Precision Co., Ltd., Taichung (TW)

(72) Inventor: Hsin-Hsuan Huang, Taichung (TW)

(73) Assignee: LARGAN PRECISION CO., LTD., Taichung (TW)

( * ) Notice: Subject to any disclaimer, the term of this patent is extended or adjusted under 35 U.S.C. 154(b) by 0 days.

(21) Appl. No.: 14/324,631

(22) Filed: Jul. 7, 2014

(65) Prior Publication Data

US 2015/0319389 A1 Nov. 5, 2015

(30) Foreign Application Priority Data

May 2, 2014 (TW) .............................. 103115849 A

(51) Int. Cl.
*G02B 9/62* (2006.01)
*H04N 5/374* (2011.01)
*G02B 13/00* (2006.01)
*H04N 5/238* (2006.01)

(52) U.S. Cl.
CPC ............ *H04N 5/374* (2013.01); *G02B 13/0045* (2013.01); *H04N 5/238* (2013.01)

(58) Field of Classification Search
CPC .............................. G02B 9/62; G02B 13/0045
See application file for complete search history.

(56) References Cited

U.S. PATENT DOCUMENTS

| 8,335,043 B2 | 12/2012 | Huang |
| 2012/0243108 A1 | 9/2012 | Tsai et al. |
| 2013/0016278 A1 | 1/2013 | Matsusaka et al. |
| 2014/0063323 A1 | 3/2014 | Yamazaki et al. |
| 2015/0049393 A1* | 2/2015 | Park .................... G02B 13/0045 359/713 |
| 2015/0055229 A1 | 2/2015 | Park et al. |
| 2015/0062721 A1 | 3/2015 | Kim et al. |

FOREIGN PATENT DOCUMENTS

| CN | 101490593 B | 9/2010 |
| JP | 2011085733 A | 4/2011 |
| TW | 201344237 A | 11/2013 |

(Continued)

OTHER PUBLICATIONS

Intellectual Property Office, Ministry of Economic Affairs, R.O.C., "Office Action", Jan. 12, 2015, Taiwan.

*Primary Examiner* — Joseph P Martinez
(74) *Attorney, Agent, or Firm* — Locke Lord LLP; Tim Tingkang Xia, Esq.

(57) ABSTRACT

A photographing optical lens assembly includes, in order from object side to image side, a first lens element, a second lens element, a third lens element, a fourth lens element, a fifth lens element and a sixth lens element. The first lens element with positive refractive power has object-side surface being convex in a paraxial region thereof. The second lens element has positive refractive power. The third and fourth lens elements have refractive power. The fifth lens element with negative refractive power has an image-side surface being concave in a paraxial region thereof. An object-side surface and the image-side surface of the fifth lens element are aspheric. The sixth lens element with refractive power has an image-side surface being concave in a paraxial region thereof. When specific conditions are satisfied, it is easier to miniaturize the photographing optical lens assembly and achieve better image quality in a limited space.

23 Claims, 17 Drawing Sheets

(56) References Cited

FOREIGN PATENT DOCUMENTS

| | | | |
|---|---|---|---|
| TW | 201411182 | A | 3/2014 |
| TW | 201447356 | A | 12/2014 |
| TW | 201447357 | A | 12/2014 |
| WO | 2014162779 | A1 | 10/2014 |

* cited by examiner

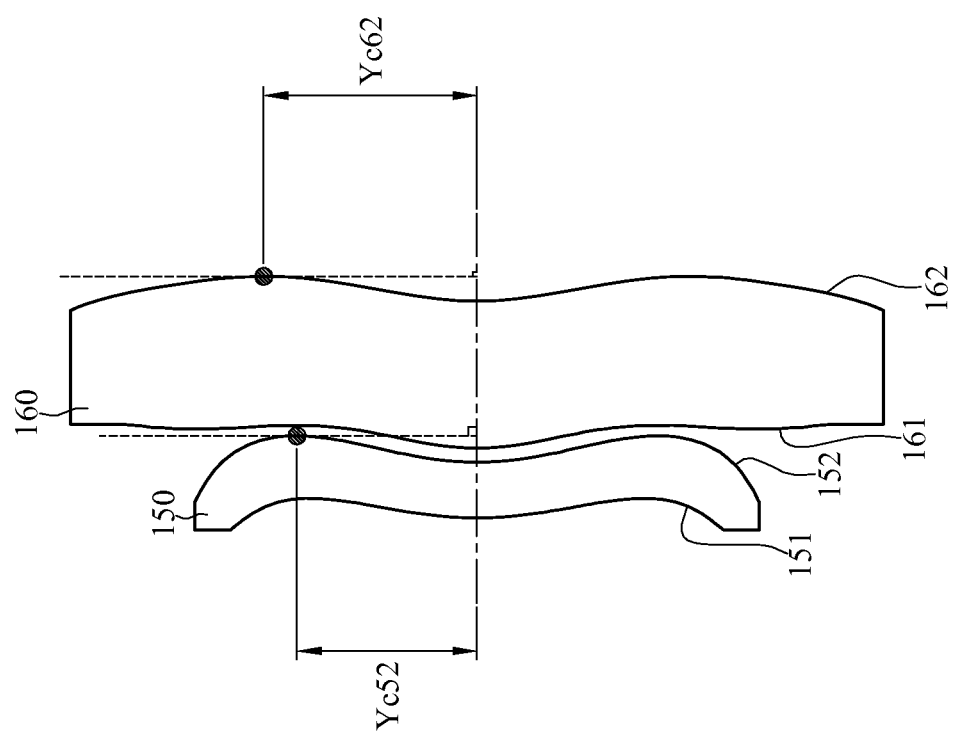

PHOTOGRAPHING OPTICAL LENS ASSEMBLY, IMAGE CAPTURING UNIT AND MOBILE DEVICE

RELATED APPLICATIONS

This application claims priority to Taiwan Application Serial Number 103115849, filed May 2, 2014, which is incorporated by reference herein in its entirety.

BACKGROUND

1. Technical Field

The present disclosure relates to a photographing optical lens assembly, an image capturing unit and a mobile device, more particularly to a photographing optical lens assembly and an image capturing unit applicable to a mobile device.

2. Description of Related Art

In recent years, with the popularity of mobile terminals having camera functionalities, the demand of miniaturized optical systems has been increasing. The sensor of a conventional optical system is typically a CCD (Charge-Coupled Device) or a CMOS (Complementary Metal-Oxide-Semiconductor) sensor. As the advanced semiconductor manufacturing technologies have allowed the pixel size of sensors to be reduced and compact optical systems have gradually evolved toward the field of higher megapixels, there is an increasing demand for compact optical systems featuring better image quality.

A conventional optical system employed in a portable electronic product mainly adopts a five-element lens structure. Due to the popularity of mobile terminals with high-end specifications, such as smart phones, tablet personal computers and wearable apparatus, the requirements for high resolution and image quality of present compact optical systems increase significantly. However, the conventional optical systems cannot satisfy these requirements of the compact optical systems.

Additionally, some conventional compact optical systems with six-element lens structure are developed in order to have improvements in image quality. However, the trend of the modern electronics gradually shifts toward compact size, which in contrast, leads to worse image quality. Therefore, there is a need for the industry to improve the six-element lens structure with excellent image quality in a limited amount of space.

SUMMARY

According to one aspect of the present disclosure, an photographing optical lens assembly includes, in order from an object side to an image side, a first lens element, a second lens element, a third lens element, a fourth lens element, a fifth lens element, and a sixth lens element. The first lens element with positive refractive power has an object-side surface being convex in a paraxial region thereof. The second lens element has positive refractive power. The third lens element has refractive power. The fourth lens element has refractive power. The fifth lens element with negative refractive power has an image-side surface being concave in a paraxial region thereof, wherein both of an object-side surface and the image-side surface of the fifth lens element are aspheric. The sixth lens element with refractive power has an image-side surface being concave in a paraxial region thereof, wherein both of an object-side surface and the image-side surface of the sixth lens element are aspheric, and the image-side surface of the sixth lens element has at least one inflection point. The photographing optical lens assembly has a total of six lens elements with refractive power. There is an air gap in a paraxial region between any two of the first lens element, the second lens element, the third lens element, the fourth lens element, the fifth lens element and the sixth lens element that are adjacent to each other. When a focal length of the photographing optical lens assembly is f, a focal length of the second lens element is f2, a curvature radius of the image-side surface of the fifth lens element is R10, and the following conditions are satisfied:

$$0.20 < f/R10; \text{ and}$$

$$0.07 < f/f2.$$

According to another aspect of the present disclosure, an image capturing unit includes the photographing optical lens assembly according to the aforementioned aspect and an image sensor, wherein the image sensor is disposed on the image side of the photographing optical lens assembly.

According to still another aspect of the present disclosure, a mobile device includes the image capturing unit according to the aforementioned aspect.

According to yet another aspect of the present disclosure, an photographing optical lens assembly includes, in order from an object side to an image side, a first lens element, a second lens element, a third lens element, a fourth lens element, a fifth lens element, and a sixth lens element. The first lens element with positive refractive power has an object-side surface being convex in a paraxial region thereof. The second lens element with positive refractive power has an object-side surface being convex in a paraxial region thereof. The third lens element has refractive power. The fourth lens element has refractive power. The fifth lens element with negative refractive power has an object-side surface being convex in a paraxial region thereof and an image-side surface being concave in a paraxial region thereof, wherein both of the object-side surface and the image-side surface of the fifth lens element are aspheric. The sixth lens element with refractive power has an image-side surface being concave in a paraxial region thereof, wherein both of an object-side surface and the image-side surface of the sixth lens element are aspheric, and the image-side surface of the sixth lens element has at least one inflection point. The photographing optical lens assembly has a total of six lens elements with refractive power. When a focal length of the photographing optical lens assembly is f, a curvature radius of the image-side surface of the fifth lens element is R10, and the following conditions are satisfied:

$$0.0 < f/R10.$$

BRIEF DESCRIPTION OF THE DRAWINGS

The disclosure can be more fully understood by reading the following detailed description of the embodiments, with reference made to the accompanying drawings as follows:

FIG. 15 is a schematic view of Yc52 of a fifth lens element and Yc62 of a sixth lens element in FIG. 1;

DETAILED DESCRIPTION

Figure 1:
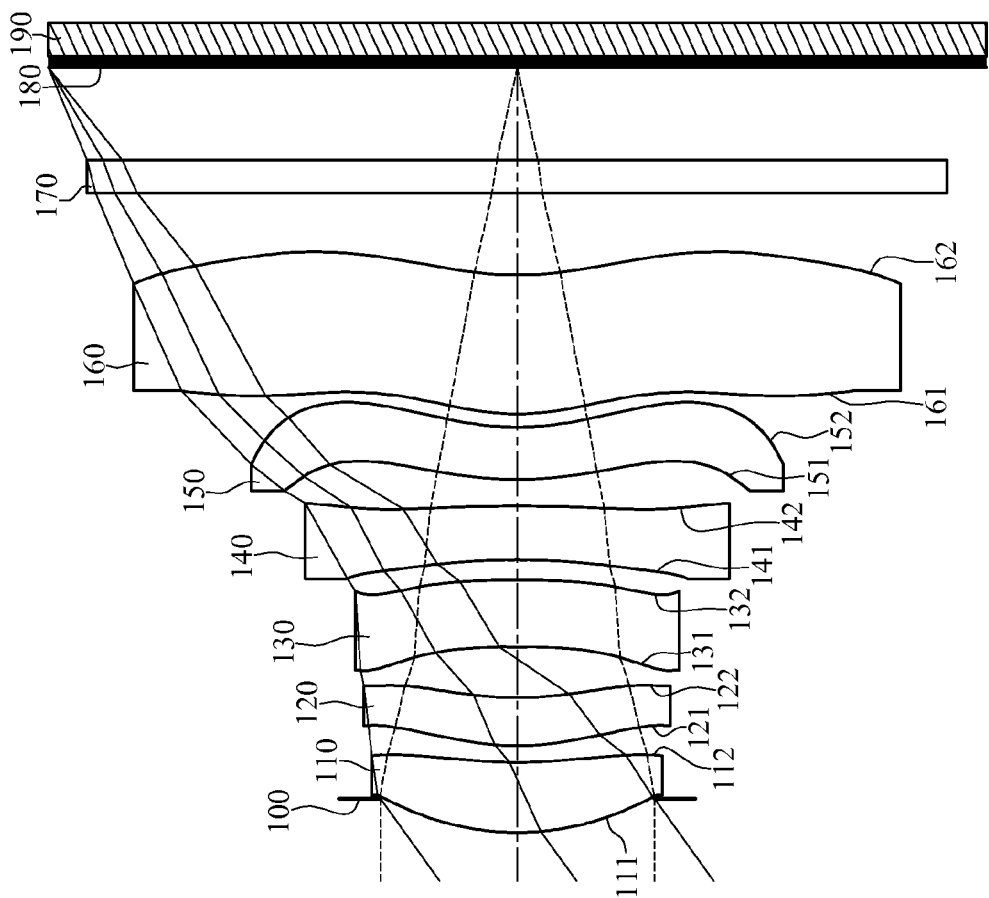
FIG. 1 is a schematic view of an image capturing unit according to the 1st embodiment of the present disclosure.

An photographing optical lens assembly includes, in order from an object side to an image side, a first lens element, a second lens element, a third lens element, a fourth lens element, a fifth lens element, and a sixth lens element. The photographing optical lens assembly has a total of six lens elements with refractive power.

The first lens element has positive refractive power so that it provides the ability to reduce the total track length thereof. The first lens element has an object-side surface being convex in a paraxial region thereof and can have an image-side surface being concave in a paraxial region thereof so that it is favorable for minimizing the refractive degree of the incident light so as to correct astigmatism.

The second lens element has positive refractive power so that it is favorable for correcting the aberration from the first lens element. The second lens element can have an object-side surface being convex in a paraxial region thereof and an image-side surface being concave in a paraxial region thereof. Therefore, it is favorable for preventing the high-order spherical aberration from becoming too large and strengthening the telephoto property of the photographing optical lens assembly so as to reduce the total track length thereof.

The third lens element can have negative refractive power. Therefore, it is favorable for correcting the aberration.

The fourth lens element can have positive refractive power. Therefore, it is favorable for reducing the sensitivity of the photographing optical lens assembly with the first lens element having positive refractive power. The fourth lens element can have an object-side surface being concave in a paraxial region thereof and an image-side surface being convex in a paraxial region thereof. In other words, the fourth lens element can be meniscus lens. Therefore, it is favorable for correcting the astigmatism.

The fifth lens element has negative refractive power. The fifth lens element can have an object-side surface being convex in a paraxial region thereof and the object-side surface of the fifth lens element can have at least one concave shape in an off-axis region thereof. Therefore, it is favorable for reducing the incident angle of the light projecting onto an image sensor, so that it is favorable for improving the responding sensitivity of the image sensor and further correcting the aberration of the off-axis. Moreover, the fifth lens element has an image-side surface being concave in a paraxial region thereof and both of the object-side surface and the image-side surface of the fifth lens element are aspheric. Therefore, it is favorable for increasing the image quality in a limited amount of space.

The sixth lens element has refractive power. The sixth lens element can have an object-side surface being convex in a paraxial region thereof and the object-side surface of the sixth lens element can have at least one concave shape in an off-axis region thereof. Therefore, it is favorable for reducing the incident angle of the light projecting onto an image sensor, so that it is favorable for improving the responding sensitivity of the image sensor and further correcting the aberration of the off-axis. The sixth lens element has an image-side surface being concave in a paraxial region thereof. Therefore, it is favorable for the principal point of the photographing optical lens assembly being positioned away from the image side of the photographing optical lens assembly and reducing the back focal length of the photographing optical lens assembly so as to keep the photographing optical lens assembly compact. In addition, the image-side surface of the sixth lens element has at least one inflection point so that it is favorable for effectively reducing the incident angle of the light projecting onto the image sensor, so that it is favorable for improving the responding sensitivity of the image sensor and further correcting the aberration of the off-axis. Both of the object-side surface and the image-side surface of the sixth lens element are aspheric.

There is an air gap in a paraxial region between any two of the first lens element, the second lens element, the third lens element, the fourth lens element, the fifth lens element and the sixth lens element that are adjacent to each other. Therefore, it is favorable for assembling the aspheric lens elements without interference with each other and reducing the assembly difficulties.

When a focal length of the photographing optical lens assembly is f, a curvature radius of the image-side surface of the fifth lens element is R10, the following condition is satisfied: $0.0 < f/R10$. Therefore, the curvature radius of the image-side surface of the fifth lens element is configured to favorably correct the aberration of the photographing optical lens assembly. Preferably, the following condition is satisfied: $0.20 < f/R10$. More preferably, the following condition is satisfied: $0.40 < f/R10$.

When the focal length of the photographing optical lens assembly is f, a focal length of the second lens element is f2, the following condition is satisfied: $0.07 < f/f2$. Therefore, the refractive power of the second lens element is controlled at a moderate range, thereby effectively enhancing the correction of aberration of the photographing optical lens assembly and facilitating a reduction in the sensitivity of the photographing optical lens assembly. Preferably, the following condition is satisfied: $0.25 < f/f2$.

When an axial distance between the object-side surface of the first lens element and an image plane is TL, a maximum image height of the photographing optical lens assembly (half of a diagonal length of an effective photosensitive area of an image sensor) is ImgH, the following condition is satisfied:

TL/ImgH<2.0. Therefore, it is favorable for miniaturizing the photographing optical lens assembly so as to be equipped on the mobile device.

When an Abbe number of the first lens element is V1, an Abbe number of the second lens element is V2, the following condition is satisfied: 0.7<V1/V2<1.3. Therefore, it is favorable for correcting the chromatic aberration.

When a maximal field of view of the photographing optical lens assembly is FOV, the following condition is satisfied: 70 [deg.]<FOV<100 [deg.]. As the overlarge field of view results in distortion seriously and the insufficient field of view limits the capturing image scene. Therefore, it is favorable for providing a sufficient field of view, obtaining more of the image scene and avoiding the image distortion simultaneously.

When a vertical distance between a non-axial critical point on the image-side surface of the fifth lens element and the optical axis is Yc52, a vertical distance between a non-axial critical point on the image-side surface of the sixth lens element and the optical axis is Yc62, the following condition is satisfied: Yc52<Yc62. Therefore, it is favorable for correcting the aberration of the off-axis field. As seen in FIG. 15, which is a schematic view of Yc52 of a fifth lens element and Yc62 of a sixth lens element in FIG. 1. The critical point on the image-side surface of the fifth lens element is a non-axial point of the lens surface where its tangent is perpendicular to the optical axis. The critical point on the image-side surface of the sixth lens element is a non-axial point of the lens surface where its tangent is perpendicular to the optical axis. Specifically, the non-axial critical points are not located at the optical axis.

When the focal length of the photographing optical lens assembly is f, a focal length of the first lens element is f1, the focal length of the second lens element is f2, a focal length of the third lens element is f3, a focal length of the fourth lens element is f4, a focal length of the fifth lens element is f5, a focal length of the sixth lens element is f6, the following condition is satisfied: |Pmax|=max(|f/fi|, i=1, 2, 3, 4, 5, 6 (that is, a maximum value among the absolute value of the ratio of the focal length of the photographing optical lens assembly to the focal length of the first lens element, the focal length of the second lens element, the focal length of the third lens element, the focal length of the fourth lens element, the focal length of the fifth lens element and the focal length of the sixth lens element); and |Pmax|<1.0. Therefore, it is favorable for evenly distributing the refractive power of the photographing optical lens assembly to each lens element to effectively alleviate the refraction change of the incident light and decreasing the aberrations to enhance the image quality. Furthermore, it is favorable for minimizing the back focal length and keeping the photographing optical lens assembly compact.

The photographing optical lens assembly further comprises a stop. When an axial distance between the stop and the image-side surface of the sixth lens element is SD, an axial distance between the object-side surface of the first lens element and the image-side surface of the sixth lens element is Td, the following condition is satisfied: 0.75<SD/Td<1.2. Therefore, the telecentric and the wide-angle characteristics thereof are balanced to reduce the back focal length of photographing optical lens assembly whereby the total length of the photographing optical lens assembly is reduced.

When the focal length of the photographing optical lens assembly is f, the focal length of the first lens element is f1, the following condition is satisfied: f/f1<0.70. Therefore, it is favorable for preventing the high-order spherical aberration from becoming too large, thereby enhancing the image quality.

When the vertical distance between the non-axial critical point on the image-side surface of the sixth lens element and the optical axis is Yc62, the axial distance between the object-side surface of the first lens element and the image-side surface of the sixth lens element is Td, the following condition is satisfied: 0.20<Yc62/Td<0.70. Therefore, it is favorable for correcting the aberration of the off-axis field and reducing the total length of the photographing optical lens assembly, thereby reducing the total length thereof.

When a curvature radius of the object-side surface of the fifth lens element is R9, the curvature radius of the image-side surface of the fifth lens element is R10, the following condition is satisfied: 1.0<(R9+R10)/(R9−R10). Therefore, the curvature of the fifth lens element is more moderate for correcting the high-order aberration.

Each of the first lens element, the second lens element, the third lens element, the fourth lens element, the fifth lens element and the sixth lens element has a refractive index. When a maximum refractive index among the first lens element, the second lens element, the third lens element, the fourth lens element, the fifth lens element and the sixth lens element is Nmax, the following condition is satisfied: Nmax<1.7. Therefore, it is favorable for balancing the distribution of the refractive power of the photographing optical lens assembly to decrease the aberration.

When an axial distance between the second lens element and the third lens element is T23, an axial distance between the fourth lens element and the fifth lens element is T45, the following condition is satisfied: 0.4<T23/T45. Therefore, it is favorable for reducing the total length of the photographing optical lens assembly and thereby minimizing the total length thereof by properly adjusting the distance between the lens elements.

According to the photographing optical lens assembly of the present disclosure, a critical point is a non-axial point of the lens surface where its tangent is perpendicular to an optical axis.

According to the photographing optical lens assembly of the present disclosure, the lens elements thereof can be made of glass or plastic material. When the lens elements are made of glass material, the distribution of the refractive power of the photographing optical lens assembly may be more flexible to design. When the lens elements are made of plastic material, the manufacturing cost can be effectively reduced. Furthermore, surfaces of each lens element can be arranged to be aspheric, since the aspheric surface of the lens element is easy to form a shape other than spherical surface so as to have more controllable variables for eliminating the aberration thereof, and to further decrease the required number of the lens elements. Therefore, the total track length of the photographing optical lens assembly can also be reduced.

According to the photographing optical lens assembly of the present disclosure, each of an object-side surface and an image-side surface has a paraxial region and an off-axis region. The paraxial region refers to the region of the surface where light rays travel close to the optical axis, and the off-axis region refers to the region of the surface away from the paraxial region. Particularly, when the lens element has a convex surface, it indicates that the surface is convex in the paraxial region thereof; when the lens element has a concave surface, it indicates that the surface is concave in the paraxial region thereof.

According to the photographing optical lens assembly of the present disclosure, the photographing optical lens assembly can include at least one stop, such as an aperture stop, a glare stop or a field stop. Said glare stop or said field stop is set for eliminating the stray light and thereby improving the image quality thereof.

According to the photographing optical lens assembly of the present disclosure, an aperture stop can be configured as a front stop or a middle stop. A front stop disposed between an imaged object and the first lens element can provide a longer distance between an exit pupil of the photographing optical lens assembly and the image plane and thereby improves the image-sensing efficiency of an image sensor. A middle stop disposed between the first lens element and the image plane is favorable for enlarging the field of view of the photographing optical lens assembly and thereby provides a wider field of view for the same.

According to the present disclosure, an image capturing unit is provided. The image capturing unit includes the photographing optical lens assembly according to the aforementioned photographing optical lens assembly of the present disclosure, and an image sensor, wherein the image sensor is disposed on the image side of the aforementioned photographing optical lens assembly, that is, the image sensor can be disposed on or near an image plane of the aforementioned photographing optical lens assembly. In some embodiments, the image capturing unit can further include a barrel member, a holding member or a combination thereof.

Figure 17:
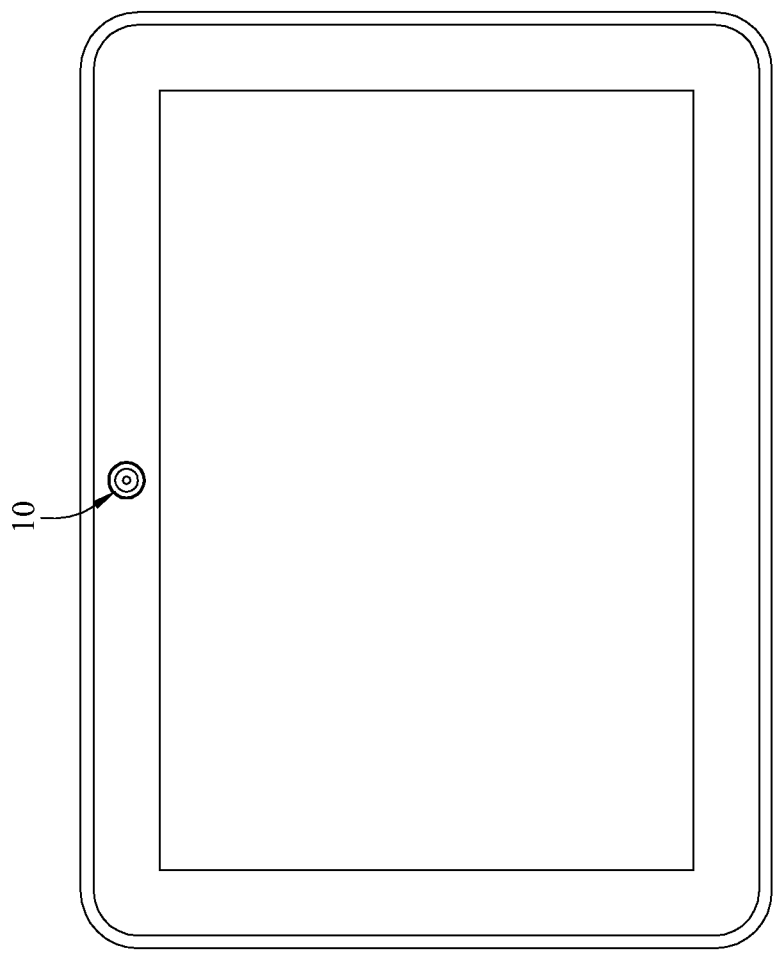
FIG. 17 shows a mobile device according to an embodiment.
Figure 16:
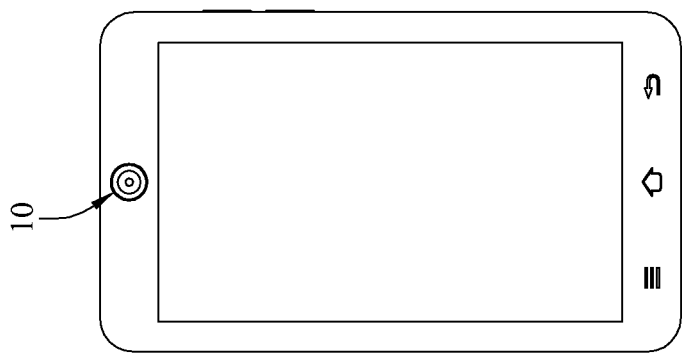
FIG. 16 shows a mobile device according to an embodiment.
Figure 18:
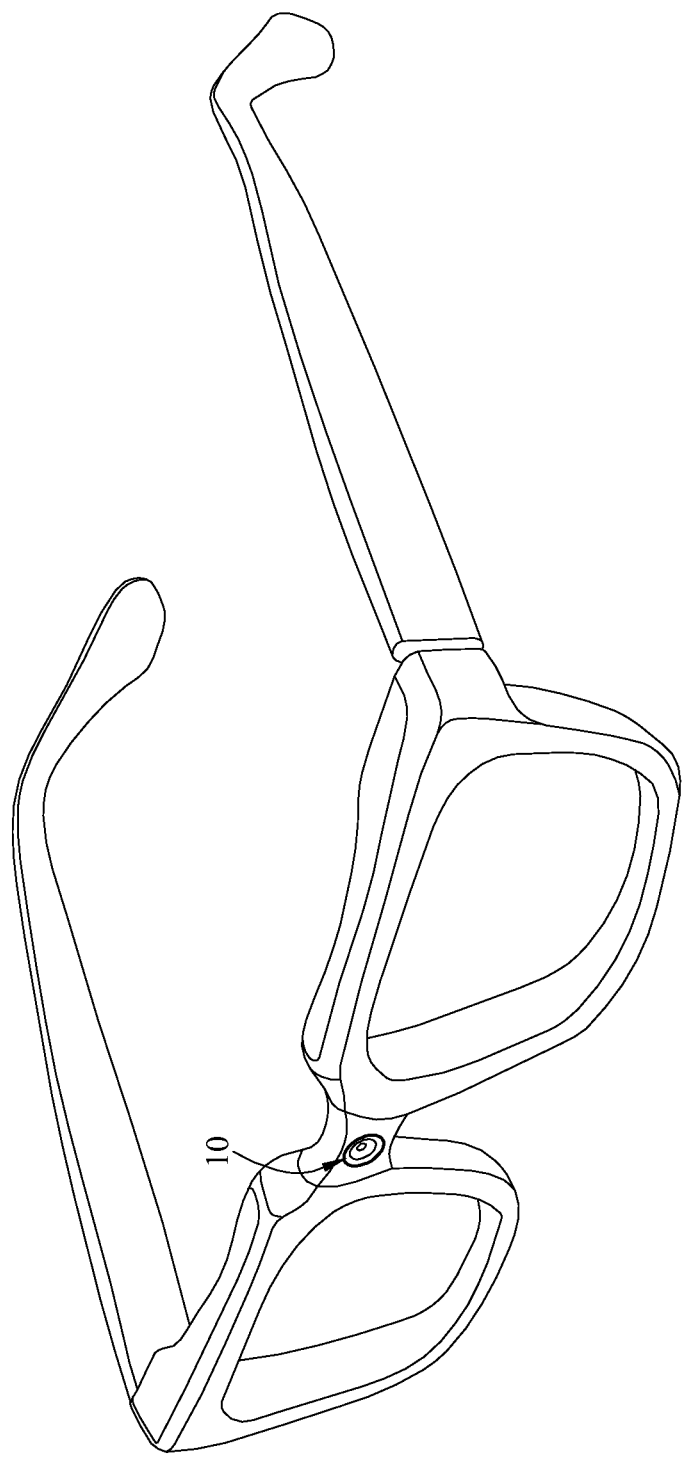
FIG. 18 shows a mobile device according to an embodiment.

In FIG. 16, FIG. 17 and FIG. 18, an image capturing device 10 may be installed in, but not limited to, a mobile terminal, including a smart phone (FIG. 16), a tablet personal computer (FIG. 17) or a wearable device (FIG. 18). The three different kinds of mobile terminal are only exemplary figures for showing the image capturing device of present disclosure installing in a mobile terminal and is not limited thereto. In some embodiments, the mobile terminal can further include, but not limited to, a display, a control unit, a random access memory unit (RAM), a read only memory unit (ROM) or a combination thereof.

According to the photographing optical lens assembly of the present disclosure, the photographing optical lens assembly can be optionally applied to moving focus optical systems. Furthermore, the photographing optical lens assembly is featured with good ability of aberrations correction and high image quality, and can be applied to 3D (three-dimensional) image capturing applications, in products such as digital cameras, mobile devices, digital tablets, wearable devices and other mobile terminals. According to the above description of the present disclosure, the following specific embodiments are provided for further explanation.

1st Embodiment

Figure 2:
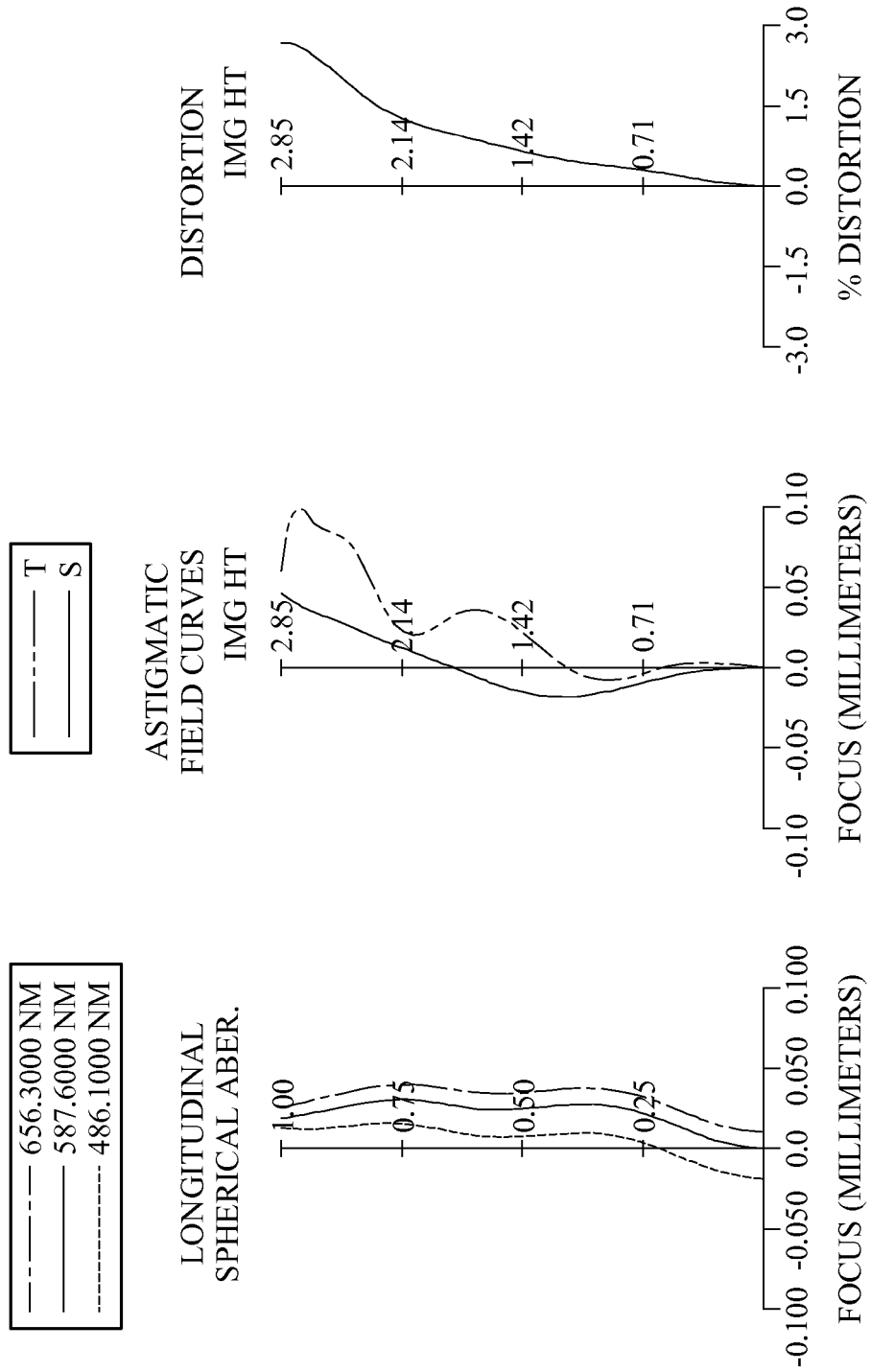
FIG. 2 shows spherical aberration curves, astigmatic field curves and a distortion curve of the image capturing unit according to the 1st embodiment.

FIG. 1 is a schematic view of an image capturing unit according to the 1st embodiment of the present disclosure. FIG. 2 shows, in order from left to right, spherical aberration curves, astigmatic field curves and a distortion curve of the image capturing unit according to the 1st embodiment. In FIG. 1, the image capturing unit includes the photographing optical lens assembly (its reference numeral is omitted) of the present disclosure and an image sensor 190. The photographing optical lens assembly includes, in order from an object side to an image side, an aperture stop 100, a first lens element 110, a second lens element 120, a third lens element 130, a fourth lens element 140, a fifth lens element 150, a sixth lens element 160, an IR-cut filter 170 and an image plane 180, wherein the photographing optical lens assembly has a total of six lens elements (110-160) with refractive power.

The first lens element 110 with positive refractive power has an object-side surface 111 being convex in a paraxial region thereof and an image-side surface 112 being concave in a paraxial region thereof. The first lens element 110 is made of plastic material and has the object-side surface 111 and the image-side surface 112 being both aspheric.

The second lens element 120 with positive refractive power has an object-side surface 121 being convex in a paraxial region thereof and an image-side surface 122 being concave in a paraxial region thereof. The second lens element 120 is made of plastic material and has the object-side surface 121 and the image-side surface 122 being both aspheric.

The third lens element 130 with negative refractive power has an object-side surface 131 being concave in a paraxial region thereof and an image-side surface 132 being convex in a paraxial region thereof. The third lens element 130 is made of plastic material and has the object-side surface 131 and the image-side surface 132 being both aspheric.

The fourth lens element 140 with negative refractive power has an object-side surface 141 being concave in a paraxial region thereof and an image-side surface 142 being convex in a paraxial region thereof. The fourth lens element 140 is made of plastic material and has the object-side surface 141 and the image-side surface 142 being both aspheric.

The fifth lens element 150 with negative refractive power has an object-side surface 151 being convex in a paraxial region thereof and an image-side surface 152 being concave in a paraxial region thereof. The object-side surface 151 can have at least one concave shape in an off-axis region thereof. The fifth lens element 150 is made of plastic material and has the object-side surface 151 and the image-side surface 152 being both aspheric.

The sixth lens element 160 with positive refractive power has an object-side surface 161 being convex in a paraxial region thereof and an image-side surface 162 being concave in a paraxial region thereof. The object-side surface 161 can have at least one concave shape in an off-axis region thereof. The image-side surface 162 of the sixth lens element 160 has at least one inflection point. The sixth lens element 160 is made of plastic material and has the object-side surface 161 and the image-side surface 162 being both aspheric.

The IR-cut filter 170 is made of glass and located between the sixth lens element 160 and the image plane 180, and will not affect the focal length of the photographing optical lens assembly. The image sensor 190 is disposed on or near the image plane 180 of the photographing optical lens assembly.

The equation of the aspheric surface profiles of the aforementioned lens elements of the 1st embodiment is expressed as follows:

$$X(Y) = (Y^2/R)/(1 + sqrt(1 - (1+k)\times(Y/R)^2)) + \sum_i (Ai)\times(Y^i),$$

where,

X is the relative distance between a point on the aspheric surface spaced at a distance Y from an optical axis and the tangential plane at the aspheric surface vertex on the optical axis;

Y is the vertical distance from the point on the aspheric surface to the optical axis;

R is the curvature radius;

k is the conic coefficient; and

Ai is the i-th aspheric coefficient, and in the embodiments, i may be, but is not limited to, 4, 6, 8, 10, 12, 14 and 16.

In the photographing optical lens assembly of the image capturing unit according to the 1st embodiment, when a focal length of the photographing optical lens assembly is f, an f-number of the photographing optical lens assembly is Fno, and half of a maximal field of view of the photographing optical lens assembly is HFOV, these parameters have the following values: f=3.83 mm; Fno=2.30; and HFOV=35.7 degrees.

When a maximum refractive index among the first lens element 110, the second lens element 120, the third lens element 130, the fourth lens element 140, the fifth lens element 150 and the sixth lens element 160 is Nmax, the following condition is satisfied: Nmax=1.65.

When an Abbe number of the first lens element 110 is V1, an Abbe number of the second lens element 120 is V2, the following condition is satisfied: V1/V2=0.99.

When an axial distance between the second lens element 120 and the third lens element 130 is T23, an axial distance between the fourth lens 140 element and the fifth lens element 150 is T45, the following condition is satisfied: T23/T45=1.90.

When a curvature radius of the object-side surface 151 of the fifth lens element 150 is R9, a curvature radius of the image-side surface 152 of the fifth lens element 150 is R10, the following condition is satisfied: (R9+R10)/(R9−R10)=8.02.

When the focal length of the photographing optical lens assembly is f, the curvature radius of the image-side surface 152 of the fifth lens element 150 is R10, the following condition is satisfied: f/R10=2.18.

When the focal length of the photographing optical lens assembly is f, a focal length of the first lens element 110 is f1, the following condition is satisfied: f/f1=0.59.

When the focal length of the photographing optical lens assembly is f, a focal length of the second lens element 120 is f2, the following condition is satisfied: f/f2=0.48.

When the focal length of the photographing optical lens assembly is f, the focal length of the first lens element 110 is f1, the focal length of the second lens element 120 is f2, a focal length of the third lens element 130 is f3, a focal length of the fourth lens element 140 is f4, a focal length of the fifth lens element 150 is f5, a focal length of the sixth lens element 160 is f6, the following condition is satisfied: |Pmax|=max (|f/fi|, i=1, 2, 3, 4, 5, 6) and |Pmax|=0.64.

When an axial distance between the aperture stop 100 and the image-side surface 162 of the sixth lens element 160 is SD, an axial distance between the object-side surface 111 of the first lens element 110 and the image-side surface 162 of the sixth lens element 160 is Td, the following condition is satisfied: SD/Td=0.94.

When a vertical distance between a non-axial critical point on the image-side surface 152 of the fifth lens element 150 and the optical axis is Yc52, the following condition is satisfied: Yc52=1.04 mm.

When a vertical distance between a non-axial critical point on the image-side surface 162 of the sixth lens element 160 and the optical axis is Yc62, the following condition is satisfied: Yc62=1.23 mm.

When the vertical distance between a non-axial critical point on the image-side surface 162 of the sixth lens element 160 and the optical axis is Yc62, the axial distance between the object-side surface 111 of the first lens element 110 and the image-side surface 162 of the sixth lens element 160 is Td, the following condition is satisfied: Yc62/Td=0.36.

When an axial distance between the object-side surface 111 of the first lens element 110 and an image plane 180 is TL, a maximum image height of the photographing optical lens assembly is ImgH, the following condition is satisfied: TL/ImgH=1.64.

When a maximal field of view of the photographing optical lens assembly is FOV, the following condition is satisfied: FOV=71.4 degrees.

The detailed optical data of the 1st embodiment are shown in Table 1 and the aspheric surface data are shown in Table 2 below.

TABLE 1

1st Embodiment
f = 3.83 mm, Fno = 2.30, HFOV = 35.7 deg.

| surface | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −0.207 | | | | |
| 2 | Lens 1 | 1.582 | (ASP) | 0.428 | Plastic | 1.544 | 55.9 | 6.52 |
| 3 | | 2.582 | (ASP) | 0.100 | | | | |
| 4 | Lens 2 | 1.421 | (ASP) | 0.294 | Plastic | 1.535 | 56.3 | 8.04 |
| 5 | | 1.969 | (ASP) | 0.310 | | | | |
| 6 | Lens 3 | −5.971 | (ASP) | 0.407 | Plastic | 1.650 | 21.4 | −34.76 |
| 7 | | −8.334 | (ASP) | 0.124 | | | | |
| 8 | Lens 4 | −4.244 | (ASP) | 0.326 | Plastic | 1.650 | 21.4 | −8.95 |
| 9 | | −16.175 | (ASP) | 0.163 | | | | |
| 10 | Lens 5 | 2.264 | (ASP) | 0.320 | Plastic | 1.544 | 55.9 | −18.84 |
| 11 | | 1.762 | (ASP) | 0.080 | | | | |
| 12 | Lens 6 | 1.382 | (ASP) | 0.846 | Plastic | 1.535 | 55.7 | 6.02 |
| 13 | | 1.905 | (ASP) | 0.500 | | | | |
| 14 | IR-cut filter | Plano | | 0.200 | Glass | 1.517 | 64.2 | — |
| 15 | | Plano | | 0.565 | | | | |
| 16 | Image | Plano | | — | | | | |

Note:
Reference wavelength is 587.6 nm (d-line).

TABLE 2

Aspheric Coefficients

| Surface # | 2 | 3 | 4 | 5 | 6 | 7 |
|---|---|---|---|---|---|---|
| k = | −4.9509E+00 | −1.3297E+00 | −2.6609E−01 | 2.8107E+00 | −6.2127E+00 | −6.3205E+00 |
| A4 = | 9.5041E−02 | −4.3680E−01 | −5.4993E−01 | −3.0423E−01 | −2.3644E−01 | −2.0486E−01 |
| A6 = | 1.2142E−01 | 1.0543E+00 | 9.8743E−01 | 2.7712E−02 | −2.2746E−02 | 2.5717E−02 |
| A8 = | −4.4268E−01 | −1.9294E+00 | −1.6509E+00 | 2.0176E−01 | 2.0645E−01 | 2.7517E−01 |
| A10 = | 5.7202E−01 | 1.9602E+00 | 1.7333E+00 | −7.4778E−01 | 6.9503E−02 | −1.2603E−01 |
| A12 = | −3.0451E−01 | −8.7636E−01 | −1.0201E+00 | 6.6906E−01 | −1.5057E−01 | −3.4020E−02 |
| A14 = | — | — | 1.9115E−01 | −1.8951E−01 | 8.4938E−02 | 6.4413E−02 |

| Surface # | 8 | 9 | 10 | 11 | 12 | 13 |
|---|---|---|---|---|---|---|
| k = | −5.5881E+01 | −1.0000E+01 | −8.4309E+00 | −1.0000E+01 | −6.8383E+00 | −8.2011E−01 |
| A4 = | −8.8174E−02 | −9.9464E−02 | 3.8776E−02 | 9.0914E−02 | −1.4784E−01 | −2.0225E−01 |
| A6 = | 5.1050E−02 | 2.7160E−01 | −2.0945E−01 | −3.0333E−01 | 3.0879E−01 | 9.9233E−02 |
| A8 = | 3.7529E−01 | −2.3245E−01 | 1.5818E−01 | 2.9593E−01 | 1.7590E−02 | −4.2260E−02 |
| A10 = | −7.8986E−01 | 1.1142E−01 | −4.5554E−02 | −1.7384E−01 | −1.0432E−02 | 1.2919E−02 |
| A12 = | 6.1918E−01 | −3.4357E−02 | −8.4776E−03 | 6.0392E−02 | 2.2159E−03 | −2.4310E−03 |
| A14 = | −1.9165E−01 | 5.1992E−03 | 4.8791E−03 | −1.1509E−02 | −2.0971E−04 | 2.4782E−04 |
| A16 = | — | — | — | 8.8304E−04 | 6.6879E−06 | −1.0503E−05 |

In Table 1, the curvature radius, the thickness and the focal length are shown in millimeters (mm). Surface numbers 0-16 represent the surfaces sequentially arranged from the object-side to the image-side along the optical axis. In Table 2, k represents the conic coefficient of the equation of the aspheric surface profiles. A4-A16 represent the aspheric coefficients ranging from the 4th order to the 16th order. The tables presented below for each embodiment are the corresponding schematic parameter and aberration curves, and the definitions of the tables are the same as Table 1 and Table 2 of the 1st embodiment. Therefore, an explanation in this regard will not be provided again.

2nd Embodiment

Figure 3:
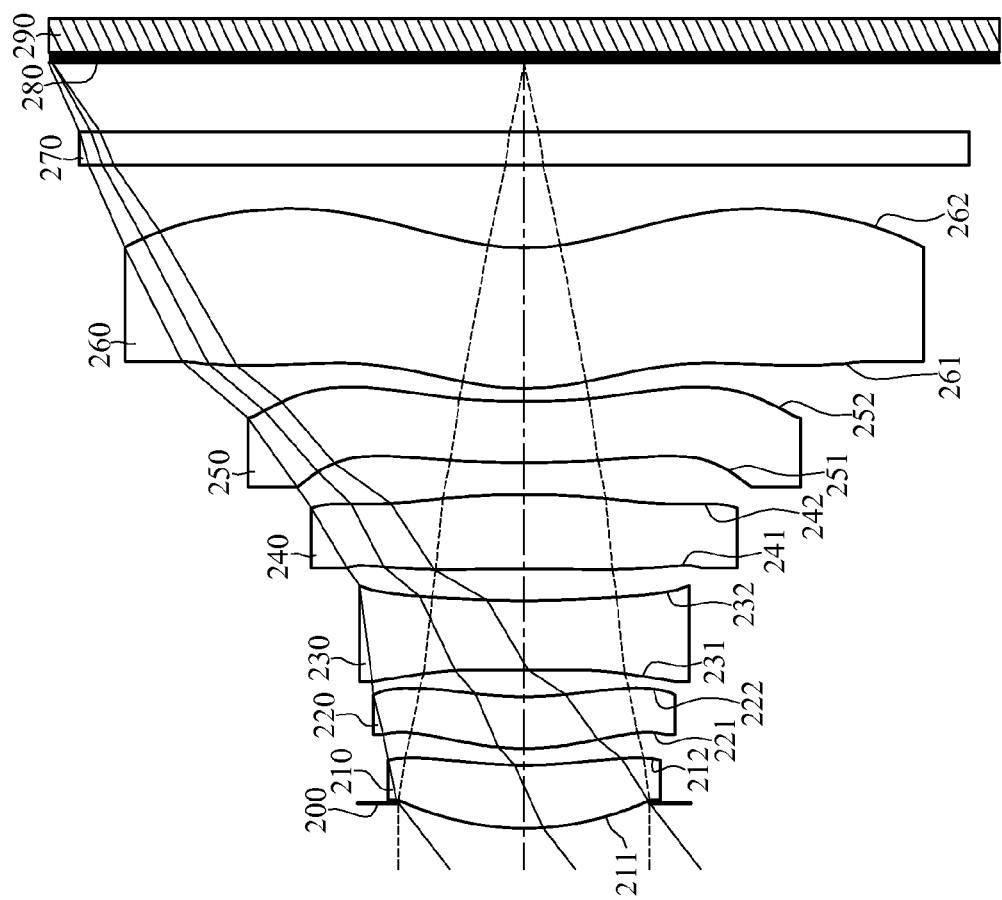
FIG. 3 is a schematic view of an image capturing unit according to the 2nd embodiment of the present disclosure.
Figure 4:
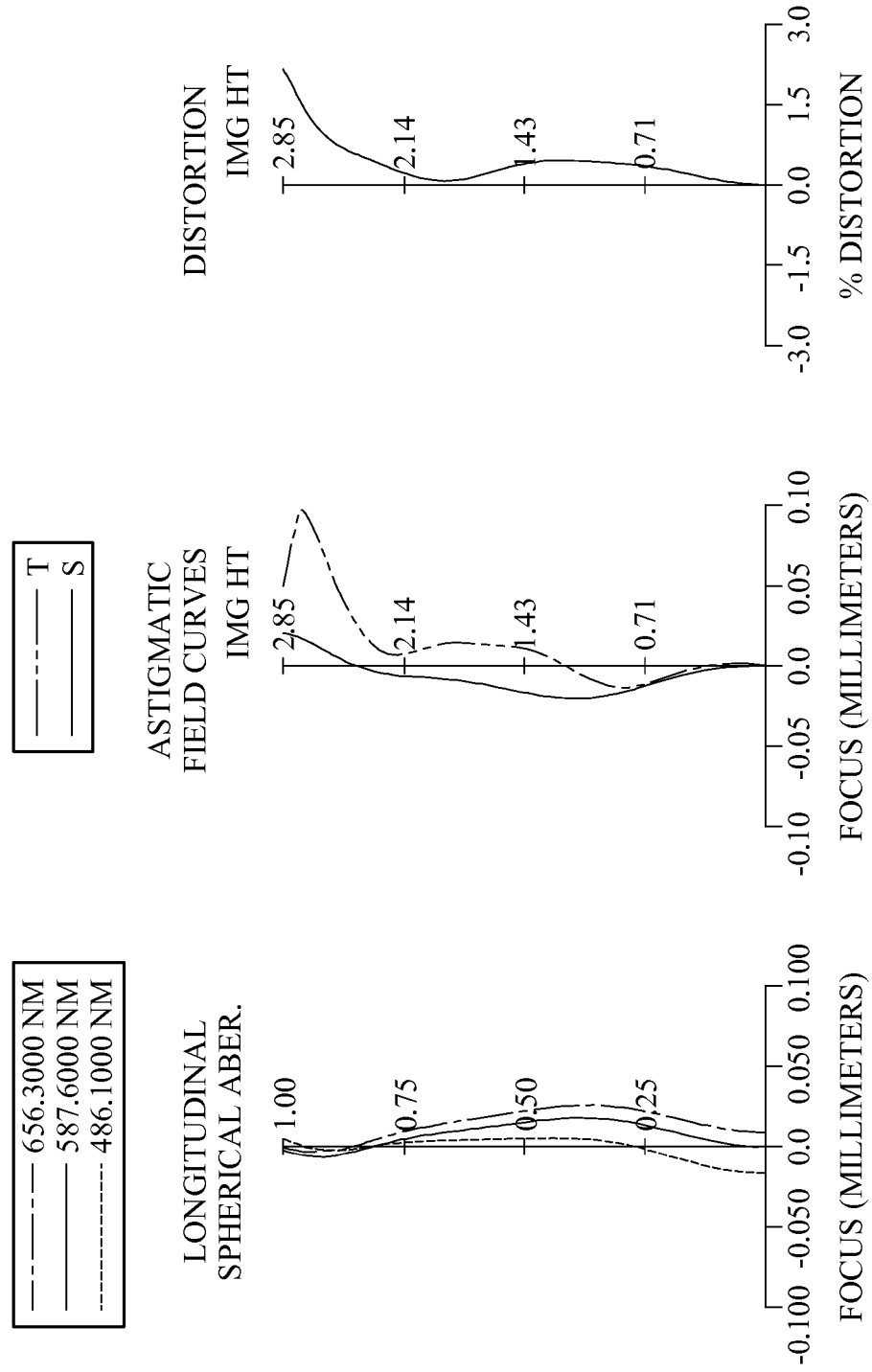
FIG. 4 shows spherical aberration curves, astigmatic field curves and a distortion curve of the image capturing unit according to the 2nd embodiment.

FIG. 3 is a schematic view of an image capturing unit according to the 2nd embodiment of the present disclosure. FIG. 4 shows, in order from left to right, spherical aberration curves, astigmatic field curves and a distortion curve of the image capturing unit according to the 2nd embodiment. In FIG. 3, the image capturing unit includes the photographing optical lens assembly (its reference numeral is omitted) of the present disclosure and an image sensor 290. The photographing optical lens assembly includes, in order from an object side to an image side an aperture stop 200, a first lens element 210, a second lens element 220, a third lens element 230, a fourth lens element 240, a fifth lens element 250, a sixth lens element 260, an IR-cut filter 270 and an image plane 280, wherein the photographing optical lens assembly has a total of six lens elements (210-260) with refractive power.

The first lens element 210 with positive refractive power has an object-side surface 211 being convex in a paraxial region thereof and an image-side surface 212 being concave in a paraxial region thereof. The first lens element 210 is made of plastic material and has the object-side surface 211 and the image-side surface 212 being both aspheric.

The second lens element 220 with positive refractive power has an object-side surface 221 being convex in a paraxial region thereof and an image-side surface 222 being concave in a paraxial region thereof. The second lens element 220 is made of plastic material and has the object-side surface 221 and the image-side surface 222 being both aspheric.

The third lens element 230 with negative refractive power has an object-side surface 231 being convex in a paraxial region thereof and an image-side surface 232 being concave in a paraxial region thereof. The third lens element 230 is made of plastic material and has the object-side surface 231 and the image-side surface 232 being both aspheric.

The fourth lens element 240 with positive refractive power has an object-side surface 241 being concave in a paraxial region thereof and an image-side surface 242 being convex in a paraxial region thereof. The fourth lens element 240 is made of plastic material and has the object-side surface 241 and the image-side surface 242 being both aspheric.

The fifth lens element 250 with negative refractive power has an object-side surface 251 being convex in a paraxial region thereof and an image-side surface 252 being concave in a paraxial region thereof. The object-side surface 251 can have at least one concave shape in an off-axis region thereof. The fifth lens element 250 is made of plastic material and has the object-side surface 251 and the image-side surface 252 being both aspheric.

The sixth lens element 260 with positive refractive power has an object-side surface 261 being convex in a paraxial region thereof and an image-side surface 262 being concave in a paraxial region thereof. The object-side surface 261 can have at least one concave shape in an off-axis region thereof. The image-side surface 262 of the sixth lens element 260 has at least one inflection point. The sixth lens element 260 is made of plastic material and has the object-side surface 261 and the image-side surface 262 being both aspheric.

The IR-cut filter 270 is made of glass and located between the sixth lens element 260 and the image plane 280, and will not affect the focal length of the photographing optical lens assembly. The image sensor 290 is disposed on or near the image plane 280 of the photographing optical lens assembly.

The detailed optical data of the 2nd embodiment are shown in Table 3 and the aspheric surface data are shown in Table 4 below.

TABLE 3

2nd Embodiment
f = 3.64 mm, Fno = 2.40, HFOV = 37.4 deg.

| surface | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −0.154 | | | | |
| 2 | Lens 1 | 1.679 | (ASP) | 0.382 | Plastic | 1.544 | 55.9 | 8.99 |
| 3 | | 2.351 | (ASP) | 0.100 | | | | |
| 4 | Lens 2 | 1.398 | (ASP) | 0.315 | Plastic | 1.535 | 56.3 | 6.41 |
| 5 | | 2.175 | (ASP) | 0.162 | | | | |
| 6 | Lens 3 | 71.941 | (ASP) | 0.420 | Plastic | 1.650 | 21.4 | −10.42 |
| 7 | | 6.172 | (ASP) | 0.190 | | | | |
| 8 | Lens 4 | −16.731 | (ASP) | 0.450 | Plastic | 1.544 | 55.9 | 14.66 |
| 9 | | −5.452 | (ASP) | 0.193 | | | | |
| 10 | Lens 5 | 8.642 | (ASP) | 0.370 | Plastic | 1.650 | 21.4 | −17.05 |
| 11 | | 4.773 | (ASP) | 0.080 | | | | |
| 12 | Lens 6 | 1.522 | (ASP) | 0.850 | Plastic | 1.535 | 55.7 | 17.17 |
| 13 | | 1.470 | (ASP) | 0.500 | | | | |
| 14 | IR-cut filter | Plano | | 0.200 | Glass | 1.517 | 64.2 | — |
| 15 | | Plano | | 0.417 | | | | |
| 16 | Image | Plano | | — | | | | |

Note:
Reference wavelength is 587.6 nm (d-line).

TABLE 4

Aspheric Coefficients

| Surface # | 2 | 3 | 4 | 5 | 6 | 7 |
|---|---|---|---|---|---|---|
| k = | −5.3127E+00 | −2.4558E+00 | −3.9804E−01 | 3.7878E+00 | −1.0000E+01 | −5.7183E+00 |
| A4 = | 7.7734E−02 | −4.4154E−01 | −5.3520E−01 | −3.5049E−01 | −2.4532E−01 | −7.4148E−02 |
| A6 = | 1.1522E−01 | 9.7073E−01 | 8.4141E−01 | 2.4653E−01 | 6.6853E−02 | 3.0583E−02 |
| A8 = | −4.2904E−01 | −1.8526E+00 | −1.5462E+00 | 2.4712E−01 | 2.4738E−01 | 1.6008E−01 |
| A10 = | 5.8643E−01 | 1.9209E+00 | 1.6787E+00 | −6.6838E−01 | −2.6253E−02 | −1.5764E−01 |
| A12 = | −3.7763E−01 | −9.3250E−01 | −1.1430E+00 | 6.4653E−01 | −2.5275E−01 | 1.7027E−02 |
| A14 = | — | — | 2.4780E−01 | −3.7405E−01 | 1.0849E−01 | 3.6604E−02 |

| Surface # | 8 | 9 | 10 | 11 | 12 | 13 |
|---|---|---|---|---|---|---|
| k = | −6.0242E+00 | −1.0000E+01 | 3.0000E+00 | 2.8707E−03 | −3.2016E+00 | −1.0167E+00 |
| A4 = | 7.0416E−02 | −9.1463E−02 | 9.8474E−02 | 1.2371E−01 | −1.6628E−01 | −2.1281E−01 |
| A6 = | −4.9288E−02 | 2.6569E−01 | −2.2231E−01 | −3.1324E−01 | 3.1719E−02 | 9.9882E−02 |
| A8 = | 3.4818E−01 | −2.2559E−01 | 1.4789E−01 | 2.9180E−01 | 1.7894E−02 | −4.2247E−02 |
| A10 = | −7.3926E−01 | 1.1234E−01 | −4.7498E−02 | −1.7031E−01 | −1.0407E−02 | 1.2918E−02 |
| A12 = | 6.2677E−01 | −3.5837E−02 | −7.5694E−03 | 6.0277E−02 | 2.2078E−03 | −2.4320E−03 |
| A14 = | −2.0686E−01 | 3.9177E−03 | 5.6766E−03 | −1.1900E−02 | −2.1159E−04 | 2.4738E−04 |
| A16 = | — | — | — | 1.0287E−03 | 7.0698E−06 | −1.0381E−05 |

In the 2nd embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 2nd embodiment, so an explanation in this regard will not be provided again.

Moreover, these parameters can be calculated from Table 3 and Table 4 as the following values and satisfy the following conditions:

2nd Embodiment

| f [mm] | 3.64 | f/f2 | 0.57 |
|---|---|---|---|
| Fno | 2.40 | |Pmax| | 0.57 |
| HFOV [deg.] | 37.4 | SD/Td | 0.96 |
| Nmax | 1.65 | Yc52 [mm] | 1.05 |
| V1/V2 | 0.99 | Yc62 [mm] | 1.42 |
| T23/T45 | 0.84 | Yc62/Td | 0.40 |
| (R9 + R10)/(R9 − R10) | 3.47 | TL/ImgH | 1.62 |

-continued

2nd Embodiment

| f/R10 | 0.76 | FOV [deg.] | 74.8 |
|---|---|---|---|
| f/f1 | 0.40 | | |

3rd Embodiment

Figure 5:
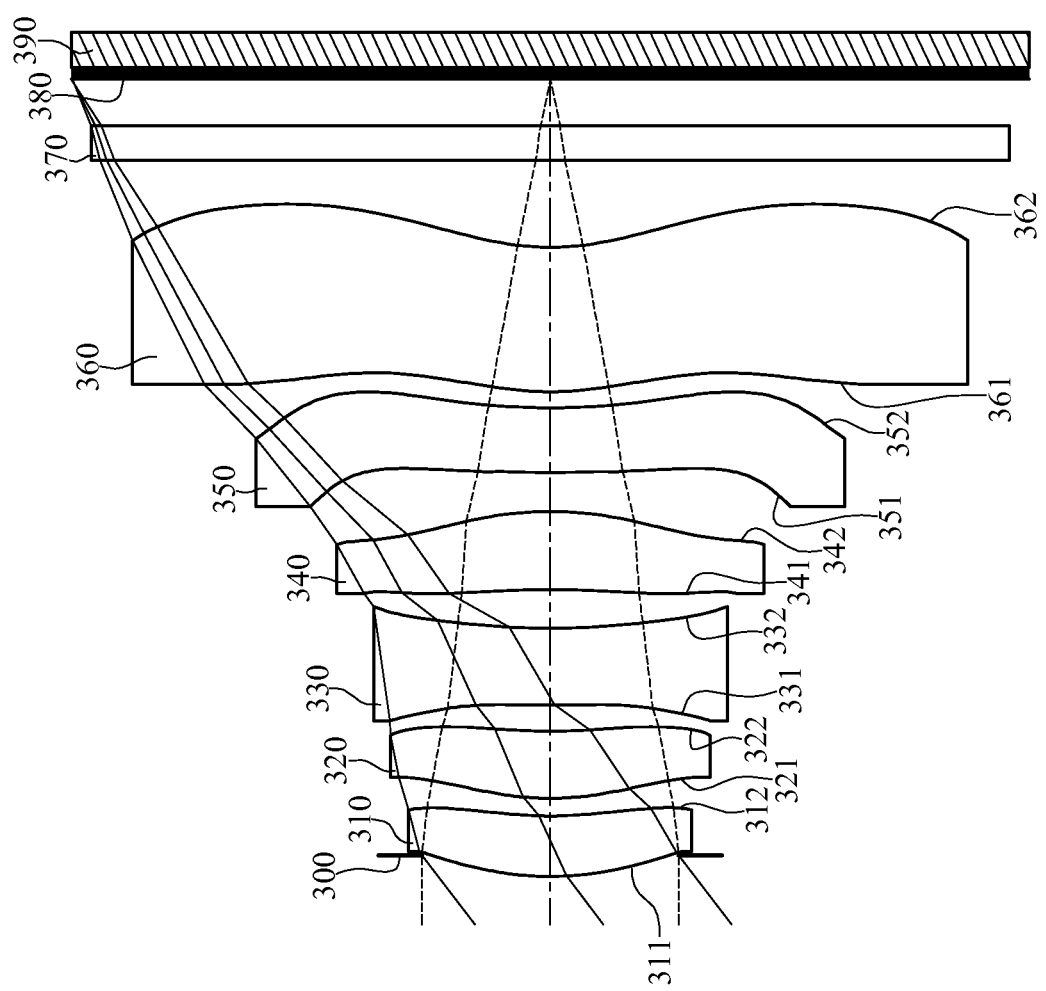
FIG. 5 is a schematic view of an image capturing unit according to the 3rd embodiment of the present disclosure.
Figure 6:
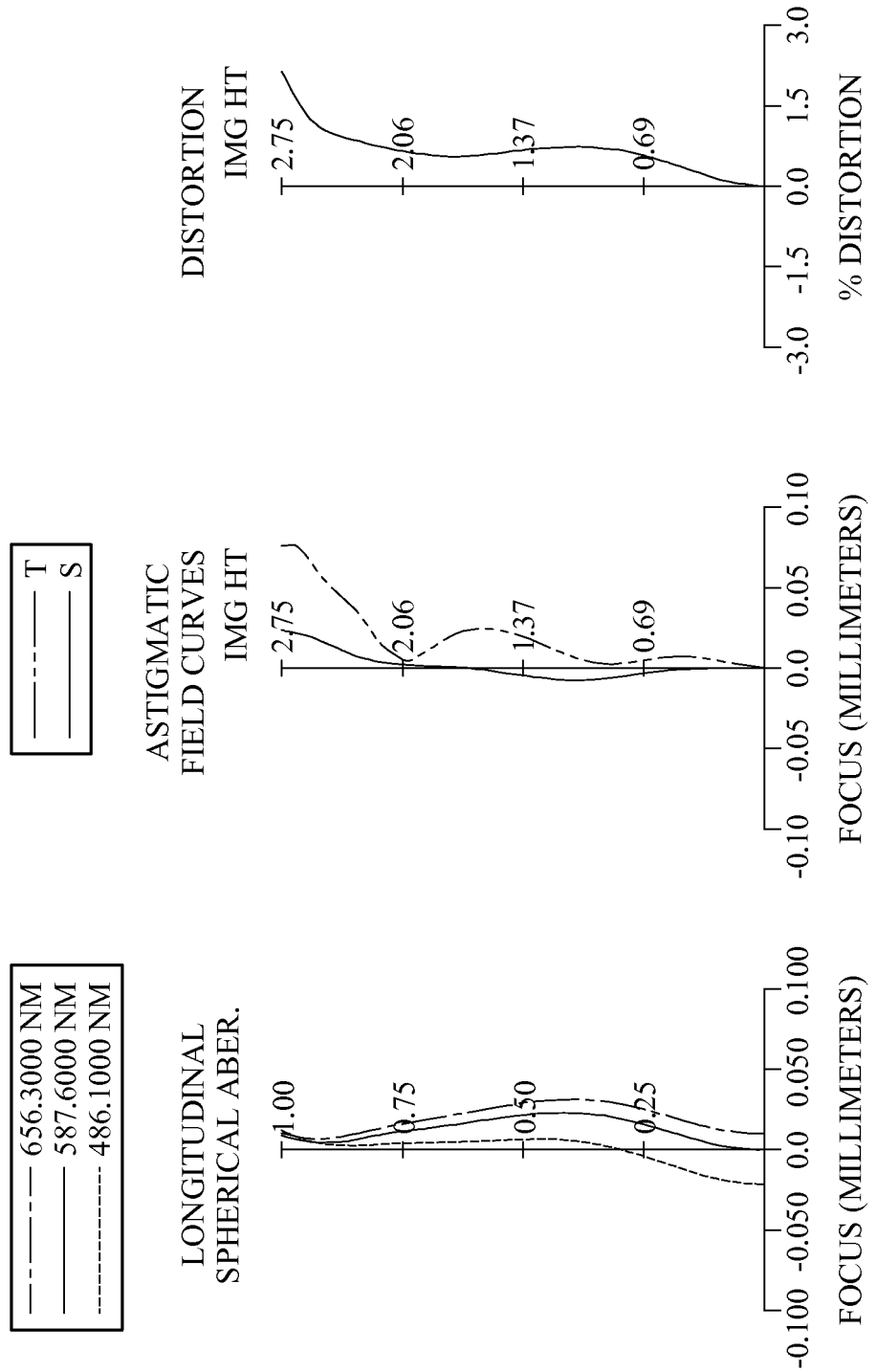
FIG. 6 shows spherical aberration curves, astigmatic field curves and a distortion curve of the image capturing unit according to the 3rd embodiment.

FIG. 5 is a schematic view of an image capturing unit according to the 3rd embodiment of the present disclosure. FIG. 6 shows, in order from left to right, spherical aberration curves, astigmatic field curves and a distortion curve of the image capturing unit according to the 3rd embodiment. In FIG. 5, the image capturing unit includes the photographing optical lens assembly (its reference numeral is omitted) of the present disclosure and an image sensor 390. The photographing optical lens assembly includes, in order from an object side to an image side, an aperture stop 300, a first lens element 310, a second lens element 320, a third lens element 330, a fourth lens element 340, a fifth lens element 350, a sixth lens element 360, an IR-cut filter 370 and an image plane 380, wherein the photographing optical lens assembly has a total of six lens elements (310-360) with refractive power.

The first lens element 310 with positive refractive power has an object-side surface 311 being convex in a paraxial region thereof and an image-side surface 312 being concave in a paraxial region thereof. The first lens element 310 is made of plastic material and has the object-side surface 311 and the image-side surface 312 being both aspheric.

The second lens element 320 with positive refractive power has an object-side surface 321 being convex in a paraxial region thereof and an image-side surface 322 being concave in a paraxial region thereof. The second lens element 320 is made of plastic material and has the object-side surface 321 and the image-side surface 322 being both aspheric.

The third lens element 330 with negative refractive power has an object-side surface 331 being convex in a paraxial region thereof and an image-side surface 332 being concave in a paraxial region thereof. The third lens element 330 is made of plastic material and has the object-side surface 331 and the image-side surface 332 being both aspheric.

The fourth lens element 340 with positive refractive power has an object-side surface 341 being concave in a paraxial region thereof and an image-side surface 342 being convex in a paraxial region thereof. The fourth lens element 340 is made of plastic material and has the object-side surface 341 and the image-side surface 342 being both aspheric.

The fifth lens element 350 with negative refractive power has an object-side surface 351 being convex in a paraxial region thereof and an image-side surface 352 being concave in a paraxial region thereof. The object-side surface 351 can have at least one concave shape in an off-axis region thereof. The fifth lens element 350 is made of plastic material and has the object-side surface 351 and the image-side surface 352 being both aspheric.

The sixth lens element 360 with negative refractive power has an object-side surface 361 being convex in a paraxial region thereof and an image-side surface 362 being concave in a paraxial region thereof. The object-side surface 361 can have at least one concave shape in an off-axis region thereof. The image-side surface 362 of the sixth lens element 360 has at least one inflection point. The sixth lens element 360 is made of plastic material and has the object-side surface 361 and the image-side surface 362 being both aspheric.

The IR-cut filter 370 is made of glass and located between the sixth lens element 360 and the image plane 380, and will not affect the focal length of the photographing optical lens assembly. The image sensor 390 is disposed on or near the image plane 380 of the photographing optical lens assembly.

The detailed optical data of the 3rd embodiment are shown in Table 5 and the aspheric surface data are shown in Table 6 below.

TABLE 5

3rd Embodiment
f = 3.53 mm, Fno = 2.40, HFOV = 37.2 deg.

| surface | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −0.123 | | | | |
| 2 | Lens 1 | 1.790 | (ASP) | 0.348 | Plastic | 1.544 | 55.9 | 13.15 |
| 3 | | 2.223 | (ASP) | 0.100 | | | | |
| 4 | Lens 2 | 1.471 | (ASP) | 0.387 | Plastic | 1.544 | 55.9 | 4.72 |
| 5 | | 3.125 | (ASP) | 0.152 | | | | |
| 6 | Lens 3 | 16.250 | (ASP) | 0.440 | Plastic | 1.639 | 23.5 | −8.18 |
| 7 | | 3.914 | (ASP) | 0.222 | | | | |
| 8 | Lens 4 | −5.180 | (ASP) | 0.450 | Plastic | 1.544 | 55.9 | 5.39 |
| 9 | | −1.930 | (ASP) | 0.226 | | | | |
| 10 | Lens 5 | 58.775 | (ASP) | 0.370 | Plastic | 1.544 | 55.9 | −9.77 |
| 11 | | 4.864 | (ASP) | 0.094 | | | | |
| 12 | Lens 6 | 1.935 | (ASP) | 0.829 | Plastic | 1.535 | 55.7 | −29.35 |
| 13 | | 1.465 | (ASP) | 0.500 | | | | |
| 14 | IR-cut filter | Plano | | 0.200 | Glass | 1.517 | 64.2 | — |
| 15 | | Plano | | 0.267 | | | | |
| 16 | Image | Plano | | — | | | | |

Note:
Reference wavelength is 587.6 nm (d-line).

TABLE 6

| Aspheric Coefficients | | | | | | |
|---|---|---|---|---|---|---|
| Surface # | 2 | 3 | 4 | 5 | 6 | 7 |
| k = | −6.9082E+00 | −1.6970E+00 | 2.4660E−01 | 8.9779E+00 | −1.0000E+01 | −4.5790E+00 |
| A4 = | 6.2781E−02 | −4.4471E−01 | −4.7464E−01 | −3.2447E−01 | −3.0571E−01 | −7.1066E−02 |
| A6 = | 1.0099E−01 | 9.0260E−01 | 7.6312E−01 | 3.1167E−01 | 5.8184E−02 | 3.4040E−02 |
| A8 = | −4.5970E−01 | −1.8162E+00 | −1.5016E+00 | 2.9037E−01 | 2.7453E−01 | 1.3334E−01 |
| A10 = | 5.8586E−01 | 1.9574E+00 | 1.7605E+00 | −6.3426E−01 | −3.8833E−02 | −1.5601E−01 |
| A12 = | −3.5217E−01 | −9.2058E−01 | −1.0760E+00 | 6.4684E−01 | −2.6334E−01 | 3.1765E−02 |
| A14 = | — | — | 1.9015E−01 | −3.8803E−01 | 1.2308E−01 | 2.5121E−02 |

TABLE 6-continued

| | Aspheric Coefficients | | | | | |
|---|---|---|---|---|---|---|
| Surface # | 8 | 9 | 10 | 11 | 12 | 13 |
| k = | −8.5264E+00 | −1.0000E+01 | −1.0000E+01 | 1.2262E+00 | −1.7774E+00 | −1.0177E+00 |
| A4 = | 9.0812E−02 | −1.2027E−01 | 1.4427E−01 | 1.3188E−01 | −1.8063E−01 | −2.1262E−01 |
| A6 = | −4.3788E−02 | 2.7337E−01 | −2.4025E−01 | −3.1620E−01 | 3.1558E−02 | 1.0127E−01 |
| A8 = | 3.5768E−01 | −2.1122E−01 | 1.4687E−01 | 2.9027E−01 | 1.8119E−02 | −4.2400E−02 |
| A10 = | −7.4388E−01 | 1.1327E−01 | −4.5440E−02 | −1.7025E−01 | −1.0389E−02 | 1.2904E−02 |
| A12 = | 6.1569E−01 | −3.7790E−02 | −6.8289E−03 | 6.0336E−02 | 2.2099E−03 | −2.4324E−03 |
| A14 = | −1.9808E−01 | 2.6417E−03 | 4.9654E−03 | −1.1895E−02 | −2.1136E−04 | 2.4701E−04 |
| A16 = | — | — | — | 1.0230E−03 | 6.7471E−06 | −1.0299E−05 |

In the 3rd embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 3rd embodiment, so an explanation in this regard will not be provided again.

Moreover, these parameters can be calculated from Table 5 and Table 6 as the following values and satisfy the following conditions:

| 3rd Embodiment | | | |
|---|---|---|---|
| f [mm] | 3.53 | f/f2 | 0.75 |
| Fno | 2.40 | |Pmax| | 0.75 |
| HFOV [deg.] | 37.2 | SD/Td | 0.97 |
| Nmax | 1.64 | Yc52 [mm] | 1.06 |
| V1/V2 | 1.00 | Yc62 [mm] | 1.50 |
| T23/T45 | 0.67 | Yc62/Td | 0.41 |
| (R9 + R10)/(R9 − R10) | 1.18 | TL/ImgH | 1.67 |
| f/R10 | 0.73 | FOV [deg.] | 74.4 |
| f/f1 | 0.27 | | |

4th Embodiment

Figure 7:
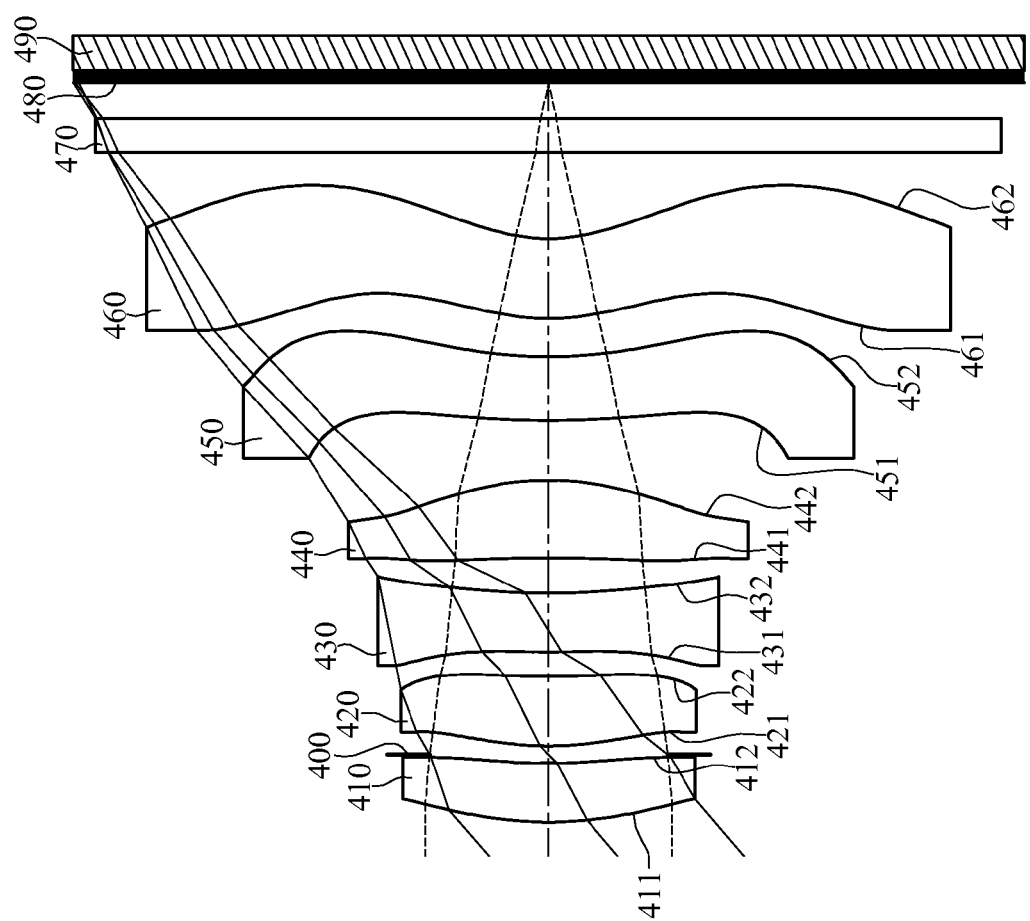
FIG. 7 is a schematic view of an image capturing unit according to the 4th embodiment of the present disclosure.
Figure 8:
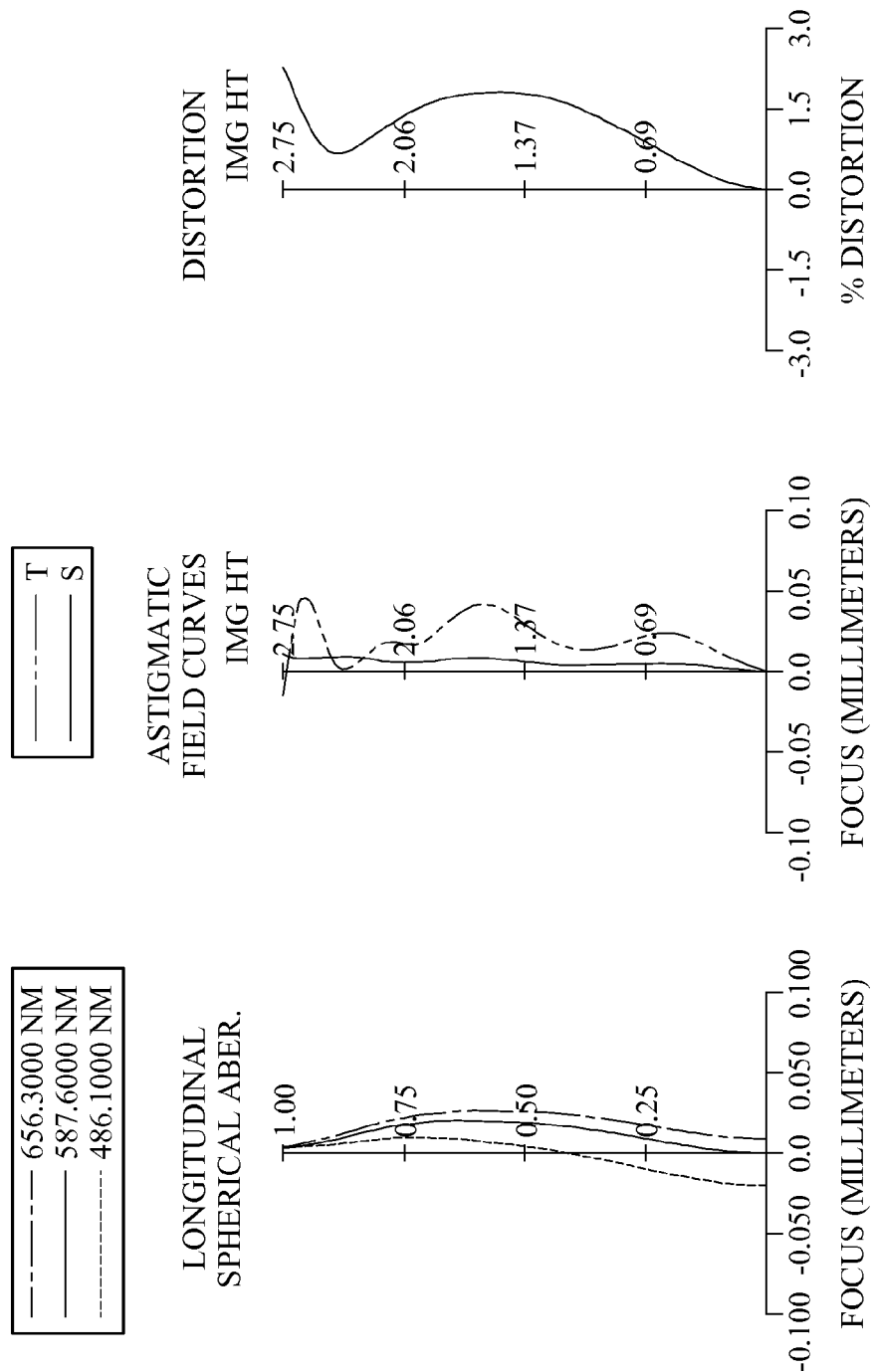
FIG. 8 shows spherical aberration curves, astigmatic field curves and a distortion curve of the image capturing unit according to the 4th embodiment.

FIG. 7 is a schematic view of an image capturing unit according to the 4th embodiment of the present disclosure. FIG. 8 shows, in order from left to right, spherical aberration curves, astigmatic field curves and a distortion curve of the image capturing unit according to the 4th embodiment. In FIG. 7, the image capturing unit includes the photographing optical lens assembly (its reference numeral is omitted) of the present disclosure and an image sensor 490. The photographing optical lens assembly includes, in order from an object side to an image side a first lens element 410, an aperture stop 400, a second lens element 420, a third lens element 430, a fourth lens element 440, a fifth lens element 450, a sixth lens element 460, an IR-cut filter 470 and an image plane 480, wherein the photographing optical lens assembly has a total of six lens elements (410-460) with refractive power.

The first lens element 410 with positive refractive power has an object-side surface 411 being convex in a paraxial region thereof and an image-side surface 412 being concave in a paraxial region thereof. The first lens element 410 is made of plastic material and has the object-side surface 411 and the image-side surface 412 being both aspheric.

The second lens element 420 with positive refractive power has an object-side surface 421 being convex in a paraxial region thereof and an image-side surface 422 being concave in a paraxial region thereof. The second lens element 420 is made of plastic material and has the object-side surface 421 and the image-side surface 422 being both aspheric.

The third lens element 430 with negative refractive power has an object-side surface 431 being convex in a paraxial region thereof and an image-side surface 432 being concave in a paraxial region thereof. The third lens element 430 is made of plastic material and has the object-side surface 431 and the image-side surface 432 being both aspheric.

The fourth lens element 440 with positive refractive power has an object-side surface 441 being concave in a paraxial region thereof and an image-side surface 442 being convex in a paraxial region thereof. The fourth lens element 440 is made of plastic material and has the object-side surface 441 and the image-side surface 442 being both aspheric.

The fifth lens element 450 with negative refractive power has an object-side surface 451 being convex in a paraxial region thereof and an image-side surface 452 being concave in a paraxial region thereof. The object-side surface 451 can have at least one concave shape in an off-axis region thereof. The fifth lens element 450 is made of plastic material and has the object-side surface 451 and the image-side surface 452 being both aspheric.

The sixth lens element 460 with negative refractive power has an object-side surface 461 being convex in a paraxial region thereof and an image-side surface 462 being concave in a paraxial region thereof. The object-side surface 461 can have at least one concave shape in an off-axis region thereof. The image-side surface 462 of the sixth lens element 460 has at least one inflection point. The sixth lens element 460 is made of plastic material and has the object-side surface 461 and the image-side surface 462 being both aspheric.

The IR-cut filter 470 is made of glass and located between the sixth lens element 460 and the image plane 480, and will not affect the focal length of the photographing optical lens assembly. The image sensor 490 is disposed on or near the image plane 480 of the photographing optical lens assembly.

The detailed optical data of the 4th embodiment are shown in Table 7 and the aspheric surface data are shown in Table 8 below.

TABLE 7

4th Embodiment
f = 3.14 mm, Fno = 2.20, HFOV = 40.5 deg.

| surface | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | 2.185 | (ASP) | 0.340 | Plastic | 1.535 | 55.7 | 16.00 |
| 2 | | 2.774 | (ASP) | 0.050 | | | | |
| 3 | Ape. Stop | Plano | | 0.050 | | | | |
| 4 | Lens 2 | 1.722 | (ASP) | 0.402 | Plastic | 1.544 | 55.9 | 5.05 |
| 5 | | 4.228 | (ASP) | 0.144 | | | | |
| 6 | Lens 3 | 9.950 | (ASP) | 0.338 | Plastic | 1.640 | 23.3 | −9.02 |
| 7 | | 3.605 | (ASP) | 0.206 | | | | |
| 8 | Lens 4 | −7.293 | (ASP) | 0.450 | Plastic | 1.544 | 55.9 | 3.80 |
| 9 | | −1.646 | (ASP) | 0.345 | | | | |
| 10 | Lens 5 | 6.663 | (ASP) | 0.370 | Plastic | 1.530 | 55.8 | −10.70 |
| 11 | | 3.004 | (ASP) | 0.221 | | | | |
| 12 | Lens 6 | 1.380 | (ASP) | 0.462 | Plastic | 1.535 | 55.7 | −12.24 |
| 13 | | 1.007 | (ASP) | 0.500 | | | | |
| 14 | IR-cut filter | Plano | | 0.200 | Glass | 1.517 | 64.2 | — |
| 15 | | Plano | | 0.205 | | | | |
| 16 | Image | Plano | | — | | | | |

Note:
Reference wavelength is 587.6 nm (d-line).

TABLE 8

Aspheric Coefficients

| Surface # | 1 | 2 | 4 | 5 | 6 | 7 |
|---|---|---|---|---|---|---|
| k = | −8.0762E+00 | 1.2428E+00 | 8.1919E−01 | 1.7566E+01 | 1.7751E+00 | −1.0000E+01 |
| A4 = | 2.5038E−03 | −4.2034E−01 | −4.1665E−01 | −3.2052E−01 | −3.2484E−01 | −8.9809E−02 |
| A6 = | 1.1012E−01 | 8.2615E−01 | 6.2441E−01 | −2.8540E−02 | 1.3030E−02 | 4.5547E−02 |
| A8 = | −3.4046E−01 | −1.6439E+00 | −1.3433E+00 | 2.5969E−01 | 2.9339E−01 | 1.0847E−01 |
| A10 = | 4.2675E−01 | 2.0656E+00 | 1.8205E+00 | −6.5996E−01 | −1.7576E−02 | −1.5147E−01 |
| A12 = | −2.3773E−01 | −1.2291E+00 | −1.3491E+00 | 6.4214E−01 | −2.7641E−01 | 5.2428E−02 |
| A14 = | — | — | −9.8433E−02 | −4.1222E−01 | 1.7876E−01 | 1.6392E−02 |

| Surface # | 8 | 9 | 10 | 11 | 12 | 13 |
|---|---|---|---|---|---|---|
| k = | 3.0000E+00 | −1.0000E+01 | −1.0000E+01 | −1.0000E+01 | −2.0085E+00 | −2.3577E+00 |
| A4 = | 7.2043E−02 | −2.0564E−01 | 8.3844E−02 | 1.4598E−01 | −2.2342E−01 | −1.9731E−01 |
| A6 = | −5.5384E−02 | 2.8057E−01 | −2.1547E−01 | −3.2036E−01 | 3.4061E−02 | 1.0368E−01 |
| A8 = | 3.8333E−01 | −1.7492E−01 | 1.4031E−01 | 2.9409E−01 | 1.9776E−02 | −4.3850E−02 |
| A10 = | −7.3502E−01 | 1.2171E−01 | −4.4572E−02 | −1.6989E−01 | −1.0450E−02 | 1.2964E−02 |
| A12 = | 6.0032E−01 | −4.2792E−02 | 1.7226E−03 | 6.0058E−02 | 2.1787E−03 | −2.3840E−03 |
| A14 = | −1.9542E−01 | −2.7381E−03 | 4.0977E−04 | −1.1968E−02 | −2.1489E−04 | 2.4281E−04 |
| A16 = | — | — | — | 1.0239E−03 | 7.7919E−06 | −1.0420E−05 |

In the 4th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 4th embodiment, so an explanation in this regard will not be provided again.

Moreover, these parameters can be calculated from Table 7 and Table 8 as the following values and satisfy the following conditions:

| 4th Embodiment | | | |
|---|---|---|---|
| f [mm] | 3.14 | f/f2 | 0.62 |
| Fno | 2.20 | |Pmax| | 0.83 |
| HFOV [deg.] | 40.5 | SD/Td | 0.88 |
| Nmax | 1.64 | Yc52 [mm] | 1.17 |
| V1/V2 | 1.00 | Yc62 [mm] | 1.37 |
| T23/T45 | 0.42 | Yc62/Td | 0.40 |
| (R9 + R10)/(R9 − R10) | 2.64 | TL/ImgH | 1.56 |

-continued

| 4th Embodiment | | | |
|---|---|---|---|
| f/R10 | 1.04 | FOV [deg.] | 81.0 |
| f/f1 | 0.20 | | |

5th Embodiment

Figure 9:
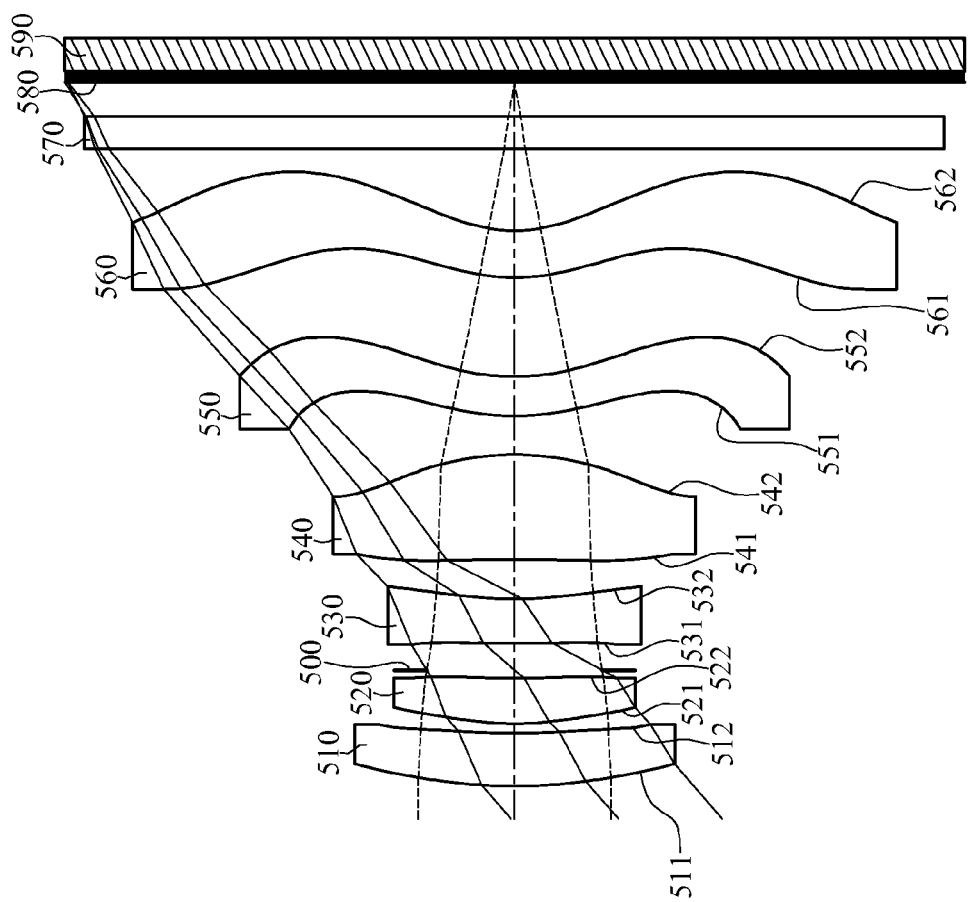
FIG. 9 is a schematic view of an image capturing unit according to the 5th embodiment of the present disclosure.
Figure 10:
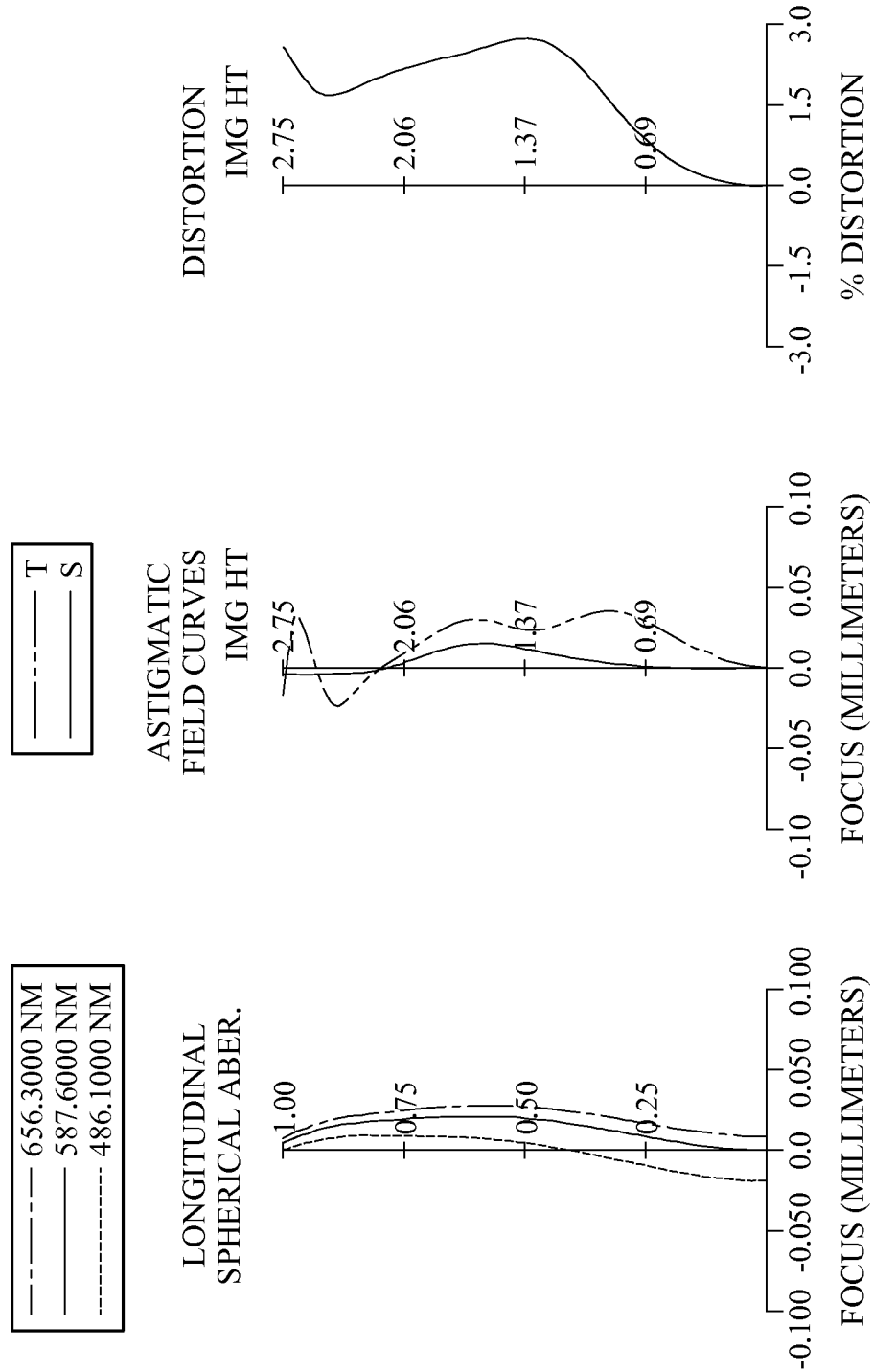
FIG. 10 shows spherical aberration curves, astigmatic field curves and a distortion curve of the image capturing unit according to the 5th embodiment.

FIG. 9 is a schematic view of an image capturing unit according to the 5th embodiment of the present disclosure. FIG. 10 shows, in order from left to right, spherical aberration curves, astigmatic field curves and a distortion curve of the image capturing unit according to the 5th embodiment. In FIG. 9, the image capturing unit includes the photographing optical lens assembly (its reference numeral is omitted) of the present disclosure and an image sensor 590. The photographing optical lens assembly includes, in order from an object side to an image side, a first lens element 510, a second lens element 520, an aperture stop 500, a third lens element 530, a fourth lens element 540, a fifth lens element 550, a sixth lens element 560, an IR-cut filter 570 and an image plane 580, wherein the photographing optical lens assembly has a total of six lens elements (510-560) with refractive power.

The first lens element 510 with positive refractive power has an object-side surface 511 being convex in a paraxial region thereof and an image-side surface 512 being concave in a paraxial region thereof. The first lens element 510 is made of plastic material and has the object-side surface 511 and the image-side surface 512 being both aspheric.

The second lens element 520 with positive refractive power has an object-side surface 521 being convex in a paraxial region thereof and an image-side surface 522 being concave in a paraxial region thereof. The second lens element 520 is made of plastic material and has the object-side surface 521 and the image-side surface 522 being both aspheric.

The third lens element 530 with negative refractive power has an object-side surface 531 being convex in a paraxial region thereof and an image-side surface 532 being concave in a paraxial region thereof. The third lens element 530 is made of plastic material and has the object-side surface 531 and the image-side surface 532 being both aspheric.

The fourth lens element 540 with positive refractive power has an object-side surface 541 being concave in a paraxial region thereof and an image-side surface 542 being convex in a paraxial region thereof. The fourth lens element 540 is made of plastic material and has the object-side surface 541 and the image-side surface 542 being both aspheric.

The fifth lens element 550 with negative refractive power has an object-side surface 551 being convex in a paraxial region thereof and an image-side surface 552 being concave in a paraxial region thereof, The object-side surface 551 can have at least one concave shape in an off-axis region thereof. The fifth lens element 550 is made of plastic material and has the object-side surface 551 and the image-side surface 552 being both aspheric.

The sixth lens element 560 with negative refractive power has an object-side surface 561 being convex in a paraxial region thereof and an image-side surface 562 being concave in a paraxial region thereof. The object-side surface 561 can have at least one concave shape in an off-axis region thereof. The image-side surface 562 of the sixth lens element 560 has at least one inflection point. The sixth lens element 560 is made of plastic material and has the object-side surface 561 and the image-side surface 562 being both aspheric.

The IR-cut filter 570 is made of glass and located between the sixth lens element 560 and the image plane 580, and will not affect the focal length of the photographing optical lens assembly. The image sensor 590 is disposed on or near the image plane 580 of the photographing optical lens assembly.

The detailed optical data of the 5th embodiment are shown in Table 9 and the aspheric surface data are shown in Table 10 below.

TABLE 9

5th Embodiment
f = 3.06 mm, Fno = 2.60, HFOV = 41.1 deg.

| surface | | Curvature Radius | | Thickness | Material | Index | Abbe# | Focal Length |
|---|---|---|---|---|---|---|---|---|
| 0 | Object | Plano | | Infinity | | | | |
| 1 | Lens 1 | 3.092 | (ASP) | 0.324 | Plastic | 1.535 | 55.7 | 32.29 |
| 2 | | 3.629 | (ASP) | 0.058 | | | | |
| 3 | Lens 2 | 1.775 | (ASP) | 0.278 | Plastic | 1.544 | 55.9 | 4.78 |
| 4 | | 5.286 | (ASP) | 0.050 | | | | |
| 5 | Ape. Stop | Plano | | 0.161 | | | | |
| 6 | Lens 3 | 4.439 | (ASP) | 0.274 | Plastic | 1.640 | 23.3 | −8.07 |
| 7 | | 2.330 | (ASP) | 0.241 | | | | |
| 8 | Lens 4 | −10.338 | (ASP) | 0.642 | Plastic | 1.544 | 55.9 | 3.79 |
| 9 | | −1.759 | (ASP) | 0.237 | | | | |
| 10 | Lens 5 | 1.506 | (ASP) | 0.240 | Plastic | 1.530 | 55.8 | −41.91 |
| 11 | | 1.332 | (ASP) | 0.607 | | | | |
| 12 | Lens 6 | 1.155 | (ASP) | 0.288 | Plastic | 1.535 | 55.7 | −9.89 |
| 13 | | 0.866 | (ASP) | 0.500 | | | | |
| 14 | IR-cut filter | Plano | | 0.200 | Glass | 1.517 | 64.2 | — |
| 15 | | Plano | | 0.206 | | | | |
| 16 | Image | Plano | | — | | | | |

Note:
Reference wavelength is 587.6 nm (d-line).

TABLE 10

| | Aspheric Coefficients | | | | | |
|---|---|---|---|---|---|---|
| Surface # | 1 | 2 | 3 | 4 | 6 | 7 |
| k = | −9.0812E+00 | 3.0000E+00 | 7.3731E−01 | 4.7993E+01 | −9.8418E+00 | −6.8160E+00 |
| A4 = | −2.1732E−02 | −3.7909E−01 | −4.2918E−01 | −2.8157E−01 | −3.3351E−01 | −1.1754E−01 |
| A6 = | 1.2337E−01 | 8.5777E−01 | 7.0156E−01 | −1.0829E−01 | −4.1209E−02 | −2.5794E−02 |
| A8 = | −3.2001E−01 | −1.5472E+00 | −1.4128E+00 | 1.1262E+00 | 1.0656E−01 | 9.5758E−02 |
| A10 = | 3.8260E−01 | 1.9119E+00 | 1.8718E+00 | −2.4241E−01 | 1.8418E−01 | −6.3277E−02 |
| A12 = | −1.6036E−01 | −9.1023E−01 | −2.2008E−01 | 2.4406E+00 | 2.5876E−01 | 1.6227E−01 |
| A14 = | — | — | −9.9085E−01 | −4.1227E+00 | 4.4405E−01 | −1.5331E−01 |

TABLE 10-continued

| | Aspheric Coefficients | | | | | |
|---|---|---|---|---|---|---|
| Surface # | 8 | 9 | 10 | 11 | 12 | 13 |
| k = | −1.0000E+01 | −1.0000E+01 | −4.5172E+00 | −4.6096E+00 | −2.5463E+00 | −2.1516E+00 |
| A4 = | 8.7992E−02 | −2.4087E−01 | −1.2843E−02 | 9.3295E−02 | −2.1855E−01 | −2.0790E−01 |
| A6 = | −7.2116E−02 | 2.4791E−01 | −1.9117E−01 | −3.2030E−01 | 3.4027E−02 | 1.0433E−01 |
| A8 = | 3.8815E−01 | −1.5424E−01 | 1.3940E−01 | 3.0384E−01 | 1.9658E−02 | −4.3826E−02 |
| A10 = | −7.1702E−01 | 1.4101E−01 | −4.5867E−02 | −1.7106E−01 | −1.0475E−02 | 1.2966E−02 |
| A12 = | 6.0552E−01 | −3.8354E−02 | 5.8148E−03 | 5.9422E−02 | 2.1743E−03 | −2.3838E−03 |
| A14 = | −2.0736E−01 | −9.7818E−03 | −1.0825E−03 | −1.2003E−02 | −2.1449E−04 | 2.4273E−04 |
| A16 = | — | — | — | 1.0726E−03 | 8.1231E−06 | −1.0390E−05 |

In the 5th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 5th embodiment, so an explanation in this regard will not be provided again.

Moreover, these parameters can be calculated from Table 9 and Table 10 as the following values and satisfy the following conditions:

| 5th Embodiment | | | |
|---|---|---|---|
| f [mm] | 3.06 | f/f2 | 0.64 |
| Fno | 2.60 | |Pmax| | 0.81 |
| HFOV [deg.] | 41.1 | SD/Td | 0.79 |
| Nmax | 1.64 | Yc52 [mm] | 1.18 |
| V1/V2 | 1.00 | Yc62 [mm] | 1.36 |
| T23/T45 | 0.89 | Yc62/Td | 0.40 |
| (R9 + R10)/(R9 − R10) | 16.36 | TL/ImgH | 1.57 |
| f/R10 | 2.30 | FOV [deg.] | 82.2 |
| f/f1 | 0.09 | | |

6th Embodiment

Figure 11:
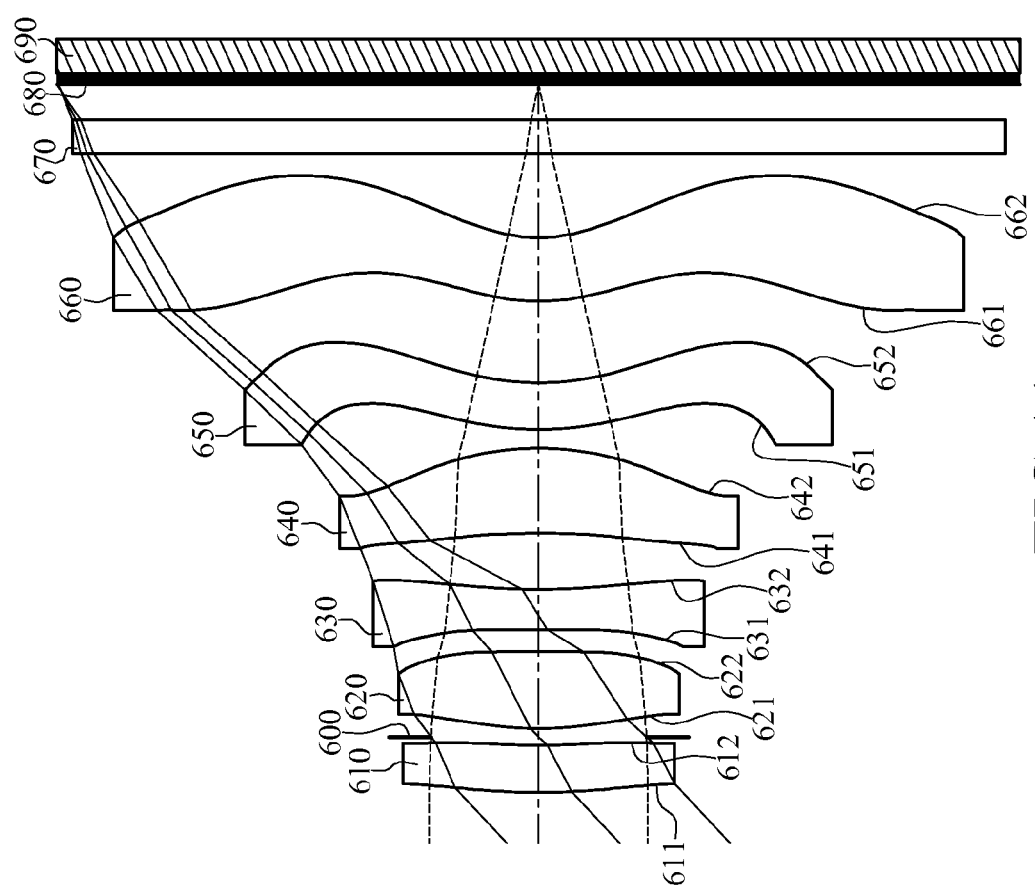
FIG. 11 is a schematic view of an image capturing unit according to the 6th embodiment of the present disclosure.
Figure 12:
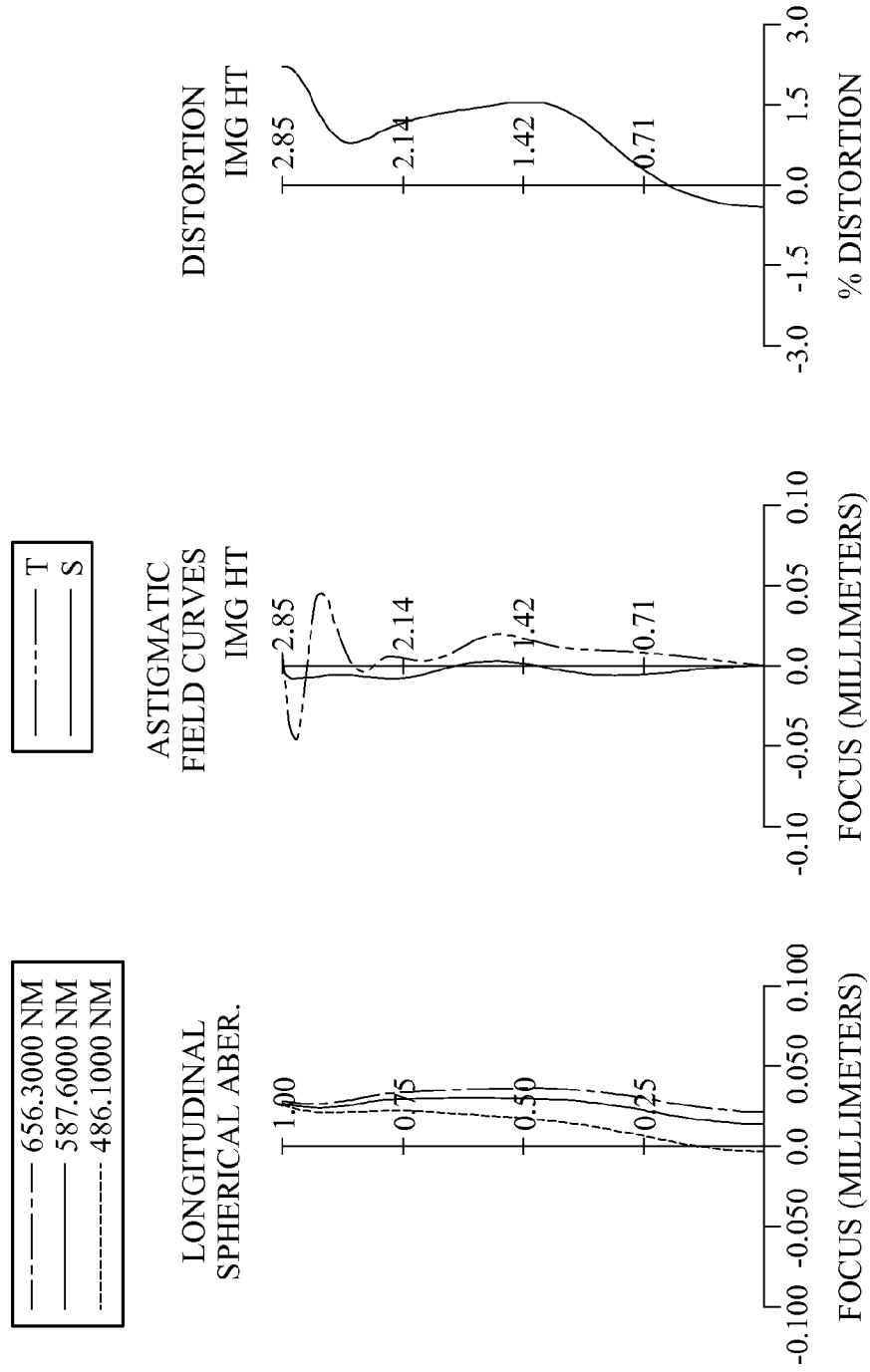
FIG. 12 shows spherical aberration curves, astigmatic field curves and a distortion curve of the image capturing unit according to the 6th embodiment.

FIG. 11 is a schematic view of an image capturing unit according to the 6th embodiment of the present disclosure. FIG. 12 shows, in order from left to right, spherical aberration curves, astigmatic field curves and a distortion curve of the image capturing unit according to the 6th embodiment. In FIG. 11, the image capturing unit includes the photographing optical lens assembly (its reference numeral is omitted) of the present disclosure and an image sensor 690. The photographing optical lens assembly includes, in order from an object side to an image side, a first lens element 610, an aperture stop 600, a second lens element 620, a third lens element 630, a fourth lens element 640, a fifth lens element 650, a sixth lens element 660, an IR-cut filter 670 and an image plane 680, wherein the photographing optical lens assembly has a total of six lens elements (610-660) with refractive power.

The first lens element 610 with positive refractive power has an object-side surface 611 being convex in a paraxial region thereof and an image-side surface 612 being concave in a paraxial region thereof. The first lens element 610 is made of plastic material and has the object-side surface 611 and the image-side surface 612 being both aspheric.

The second lens element 620 with positive refractive power has an object-side surface 621 being convex in a paraxial region thereof and an image-side surface 622 being convex in a paraxial region thereof. The second lens element 620 is made of plastic material and has the object-side surface 621 and the image-side surface 622 being both aspheric.

The third lens element 630 with negative refractive power has an object-side surface 631 being convex in a paraxial region thereof and an image-side surface 632 being concave in a paraxial region thereof. The third lens element 630 is made of plastic material and has the object-side surface 631 and the image-side surface 632 being both aspheric.

The fourth lens element 640 with positive refractive power has an object-side surface 641 being concave in a paraxial region thereof and an image-side surface 642 being convex in a paraxial region thereof. The fourth lens element 640 is made of plastic material and has the object-side surface 641 and the image-side surface 642 being both aspheric.

The fifth lens element 650 with negative refractive power has an object-side surface 651 being convex in a paraxial region thereof and an image-side surface 652 being concave in a paraxial region thereof. The object-side surface 651 can have at least one concave shape in an off-axis region thereof. The fifth lens element 650 is made of plastic material and has the object-side surface 651 and the image-side surface 652 being both aspheric.

The sixth lens element 660 with negative refractive power has an object-side surface 661 being convex in a paraxial region thereof and an image-side surface 662 being concave in a paraxial region thereof. The object-side surface 661 can have at least one concave shape in an off-axis region thereof. The image-side surface 662 of the sixth lens element 660 has at least one inflection point. The sixth lens element 660 is made of plastic material and has the object-side surface 661 and the image-side surface 662 being both aspheric.

The IR-cut filter 670 is made of glass and located between the sixth lens element 660 and the image plane 680, and will not affect the focal length of the photographing optical lens assembly. The image sensor 690 is disposed on or near the image plane 680 of the photographing optical lens assembly.

The detailed optical data of the 6th embodiment are shown in Table 11 and the aspheric surface data are shown in Table 12 below.

TABLE 11

6th Embodiment
f = 2.98 mm, Fno = 2.30, HFOV = 42.9 deg.

| surface | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | 3.251 | (ASP) | 0.281 | Plastic | 1.535 | 55.7 | 50.21 |
| 2 | | 3.587 | (ASP) | 0.050 | | | | |
| 3 | Ape. Stop | Plano | | 0.050 | | | | |
| 4 | Lens 2 | 1.920 | (ASP) | 0.458 | Plastic | 1.544 | 55.9 | 3.40 |
| 5 | | −47.366 | (ASP) | 0.127 | | | | |
| 6 | Lens 3 | 14.000 | (ASP) | 0.240 | Plastic | 1.640 | 23.3 | −7.88 |
| 7 | | 3.682 | (ASP) | 0.335 | | | | |
| 8 | Lens 4 | −3.962 | (ASP) | 0.502 | Plastic | 1.544 | 55.9 | 5.51 |
| 9 | | −1.784 | (ASP) | 0.112 | | | | |
| 10 | Lens 5 | 1.810 | (ASP) | 0.277 | Plastic | 1.530 | 55.8 | −100.82 |
| 11 | | 1.658 | (ASP) | 0.483 | | | | |
| 12 | Lens 6 | 1.198 | (ASP) | 0.378 | Plastic | 1.535 | 55.7 | −9.69 |
| 13 | | 0.866 | (ASP) | 0.500 | | | | |
| 14 | IR-cut filter | Plano | | 0.200 | Glass | 1.517 | 64.2 | — |
| 15 | | Plano | | 0.208 | | | | |
| 16 | Image | Plano | | — | | | | |

Note:
Reference wavelength is 587.6 nm (d-line).

TABLE 12

Aspheric Coefficients

| Surface # | 1 | 2 | 4 | 5 | 6 | 7 |
|---|---|---|---|---|---|---|
| k = | −2.4754E+01 | −5.5784E+00 | 1.7708E+00 | −1.0000E+01 | 1.7982E+00 | −9.4973E+00 |
| A4 = | −6.5366E−02 | −4.1686E−01 | −3.7484E−01 | −2.7962E−01 | −3.3752E−01 | −9.7791E−02 |
| A6 = | 8.7473E−02 | 7.2161E−01 | 5.6231E−01 | −3.3071E−01 | 1.4108E−02 | 3.2985E−02 |
| A8 = | −3.1709E−01 | −1.3907E+00 | −1.4004E+00 | 2.3566E−01 | 2.8236E−01 | 1.0225E−01 |
| A10 = | 4.3445E−01 | 2.1001E+00 | 1.9458E+00 | −5.4182E−01 | 1.8125E−02 | −1.3947E−01 |
| A12 = | −1.9446E−01 | −1.3224E+00 | −5.0700E−02 | 1.7302E+00 | 1.8507E−01 | 4.8908E−02 |
| A14 = | — | — | −1.7886E+00 | −1.8688E+00 | −5.6184E−01 | −2.2811E−02 |

| Surface # | 8 | 9 | 10 | 11 | 12 | 13 |
|---|---|---|---|---|---|---|
| k = | −1.4101E+00 | −8.8958E+00 | −3.4310E+00 | −2.2143E+00 | −2.5190E+00 | −2.2267E+00 |
| A4 = | 4.9693E−02 | −2.3671E−01 | 1.9715E−02 | 8.8476E−02 | −2.1773E−01 | −2.0201E−01 |
| A6 = | −7.2682E−02 | 2.4951E−01 | −1.9563E−01 | −3.2422E−01 | 3.3994E−02 | 1.0439E−01 |
| A8 = | 3.9459E−01 | −1.7026E−01 | 1.2981E−01 | 3.0264E−01 | 1.9692E−02 | −4.3839E−02 |
| A10 = | −7.1740E−01 | 1.3116E−01 | −4.4703E−02 | −1.6991E−01 | −1.0466E−02 | 1.2953E−02 |
| A12 = | 6.0186E−01 | −3.7729E−02 | 8.4443E−03 | 5.9357E−02 | 2.1763E−03 | −2.3863E−03 |
| A14 = | −2.0609E−01 | −1.7371E−03 | −1.8650E−03 | −1.2046E−02 | −2.1471E−04 | 2.4287E−04 |
| A16 = | — | — | — | 1.0754E−03 | 7.9916E−06 | −1.0356E−05 |

In the 6th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 6th embodiment, so an explanation in this regard will not be provided again.

Moreover, these parameters can be calculated from Table 11 and Table 12 as the following values and satisfy the following conditions:

| 6th Embodiment | | | |
|---|---|---|---|
| f [mm] | 2.98 | f/f2 | 0.87 |
| Fno | 2.30 | |Pmax| | 0.87 |
| HFOV [deg.] | 42.9 | SD/Td | 0.90 |
| Nmax | 1.64 | Yc52 [mm] | 1.20 |
| V1/V2 | 1.00 | Yc62 [mm] | 1.41 |
| T23/T45 | 1.13 | Yc62/Td | 0.43 |
| (R9 + R10)/(R9 − R10) | 22.80 | TL/ImgH | 1.47 |

-continued

| 6th Embodiment | | | |
|---|---|---|---|
| f/R10 | 1.79 | FOV [deg.] | 85.8 |
| f/f1 | 0.06 | | |

7th Embodiment

Figure 13:
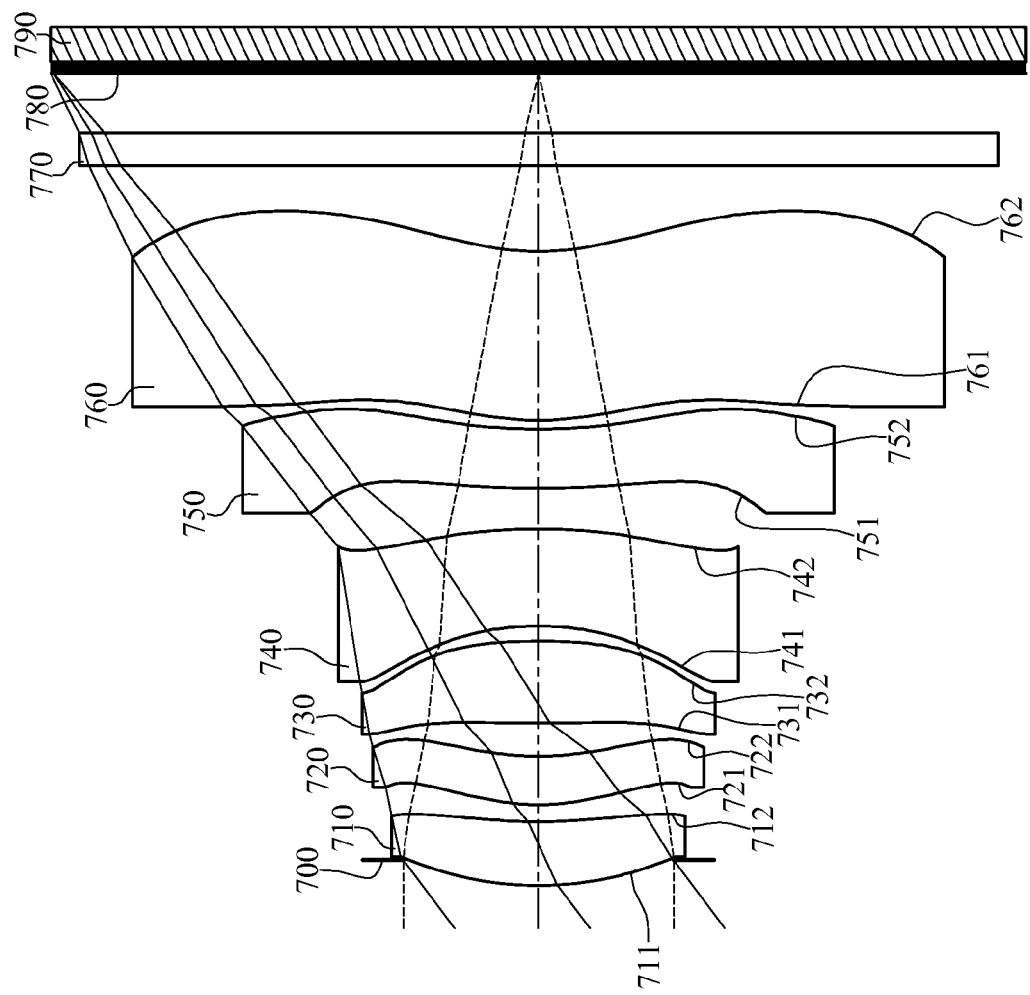
FIG. 13 is a schematic view of an image capturing unit according to the 7th embodiment of the present disclosure.
Figure 14:
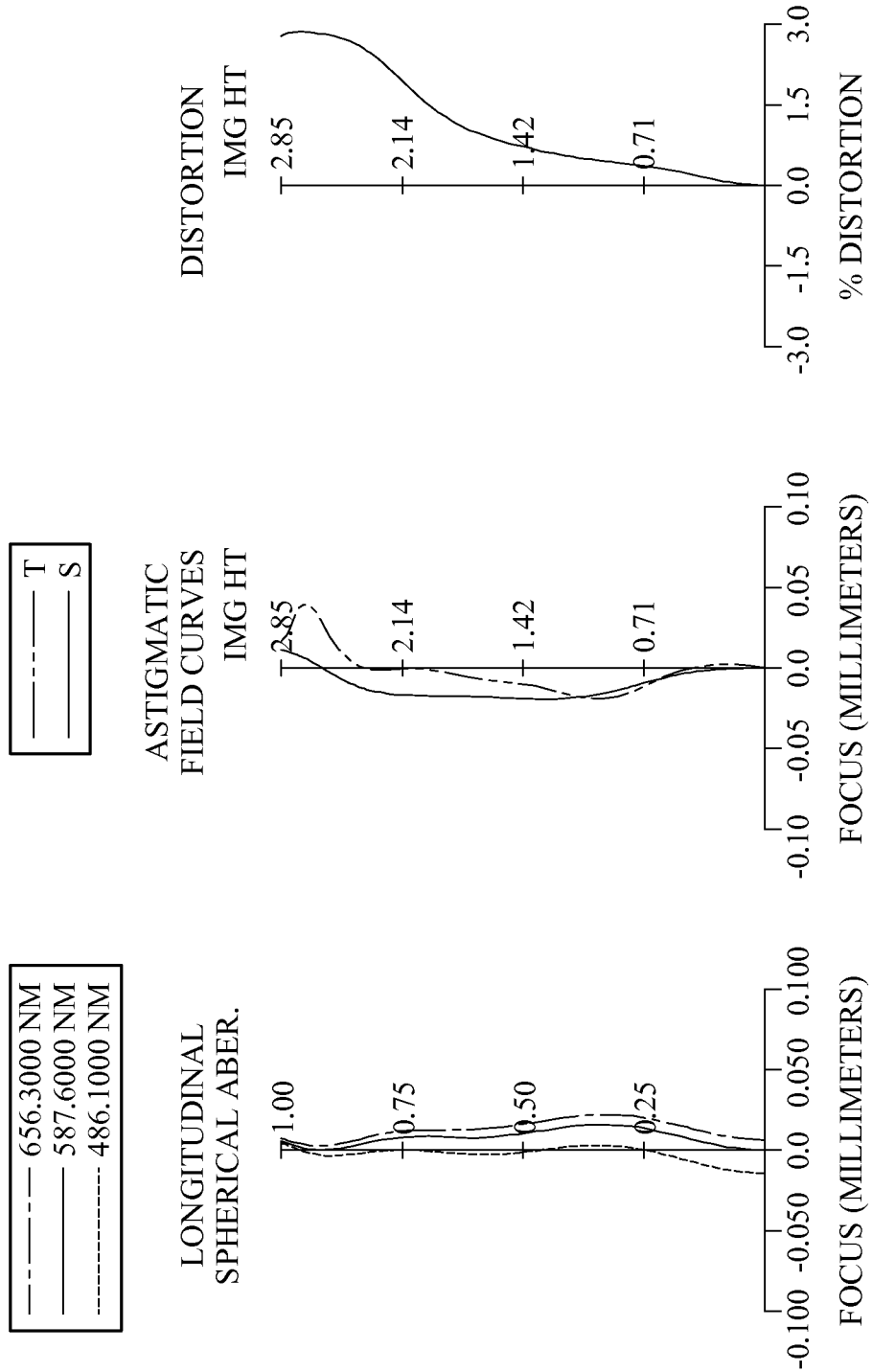
FIG. 14 shows spherical aberration curves, astigmatic field curves and a distortion curve of the image capturing unit according to the 7th embodiment.

FIG. 13 is a schematic view of an image capturing unit according to the 7th embodiment of the present disclosure. FIG. 14 shows, in order from left to right, spherical aberration curves, astigmatic field curves and a distortion curve of the image capturing unit according to the 7th embodiment. In FIG. 13, the image capturing unit includes the photographing optical lens assembly (its reference numeral is omitted) of the present disclosure and an image sensor 790. The photographing optical lens assembly includes, in order from an object side to an image side, an aperture stop 700, a first lens element 710, a second lens element 720, a third lens element 730, a fourth lens element 740, a fifth lens element 750, a sixth lens element 760, an IR-cut filter 770 and an image plane 780, wherein the photographing optical lens assembly has a total of six lens elements (710-760) with refractive power.

The first lens element 710 with positive refractive power has an object-side surface 711 being convex in a paraxial region thereof and an image-side surface 712 being concave in a paraxial region thereof. The first lens element 710 is made of plastic material and has the object-side surface 711 and the image-side surface 712 being both aspheric.

The second lens element 720 with positive refractive power has an object-side surface 721 being convex in a paraxial region thereof and an image-side surface 722 being concave in a paraxial region thereof. The second lens element 720 is made of plastic material and has the object-side surface 721 and the image-side surface 722 being both aspheric.

The third lens element 730 with positive refractive power has an object-side surface 731 being convex in a paraxial region thereof and an image-side surface 732 being convex in a paraxial region thereof. The third lens element 730 is made of plastic material and has the object-side surface 731 and the image-side surface 732 being both aspheric.

The fourth lens element 740 with negative refractive power has an object-side surface 741 being concave in a paraxial region thereof and an image-side surface 742 being convex in a paraxial region thereof. The fourth lens element 740 is made of plastic material and has the object-side surface 741 and the image-side surface 742 being both aspheric.

The fifth lens element 750 with negative refractive power has an object-side surface 751 being convex in a paraxial region thereof and an image-side surface 752 being concave in a paraxial region thereof. The object-side surface 751 can have at least one concave shape in an off-axis region thereof. The fifth lens element 750 is made of plastic material and has the object-side surface 751 and the image-side surface 752 being both aspheric.

The sixth lens element 760 with positive refractive power has an object-side surface 761 being convex in a paraxial region thereof and an image-side surface 762 being concave in a paraxial region thereof. The object-side surface 761 can have at least one concave shape in an off-axis region thereof. The image-side surface 762 of the sixth lens element 760 has at least one inflection point. The sixth lens element 760 is made of plastic material and has the object-side surface 761 and the image-side surface 762 being both aspheric.

The IR-cut filter 770 is made of glass and located between the sixth lens element 760 and the image plane 780, and will not affect the focal length of the photographing optical lens assembly. The image sensor 790 is disposed on or near the image plane 780 of the photographing optical lens assembly.

The detailed optical data of the 7th embodiment are shown in Table 13 and the aspheric surface data are shown in Table 14 below.

TABLE 13

7th Embodiment
$f = 3.66$ mm, Fno = 2.30, HFOV = 37.1 deg.

| surface | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −0.149 | | | | |
| 2 | Lens 1 | 1.933 | (ASP) | 0.376 | Plastic | 1.544 | 55.9 | 10.48 |
| 3 | | 2.723 | (ASP) | 0.100 | | | | |
| 4 | Lens 2 | 1.278 | (ASP) | 0.286 | Plastic | 1.535 | 56.3 | 8.15 |
| 5 | | 1.668 | (ASP) | 0.194 | | | | |
| 6 | Lens 3 | 8.755 | (ASP) | 0.484 | Plastic | 1.544 | 55.9 | 4.77 |
| 7 | | −3.616 | (ASP) | 0.088 | | | | |
| 8 | Lens 4 | −1.738 | (ASP) | 0.572 | Plastic | 1.632 | 23.4 | −5.73 |
| 9 | | −3.771 | (ASP) | 0.241 | | | | |
| 10 | Lens 5 | 6.803 | (ASP) | 0.348 | Plastic | 1.544 | 55.9 | −18.00 |
| 11 | | 3.942 | (ASP) | 0.050 | | | | |
| 12 | Lens 6 | 1.678 | (ASP) | 0.995 | Plastic | 1.535 | 55.7 | 23.05 |
| 13 | | 1.541 | (ASP) | 0.500 | | | | |
| 14 | IR-cut filter | Plano | | 0.200 | Glass | 1.517 | 64.2 | — |
| 15 | | Plano | | 0.348 | | | | |
| 16 | Image | Plano | | — | | | | |

Note:
Reference wavelength is 587.6 nm (d-line).

TABLE 14

Aspheric Coefficients

| Surface # | 2 | 3 | 4 | 5 | 6 | 7 |
|---|---|---|---|---|---|---|
| k = | −8.1737E+00 | 8.3939E−01 | −2.6559E−01 | 1.6108E+00 | −1.0000E+01 | 3.0000E+00 |
| A4 = | 9.4005E−02 | −4.1522E−01 | −5.2757E−01 | −3.0377E−01 | −1.5585E−01 | −2.4621E−01 |
| A6 = | 1.0564E−01 | 1.0368E+00 | 9.2669E−01 | 2.4474E−02 | −7.7138E−02 | −4.1437E−02 |
| A8 = | −4.4882E−01 | −2.0063E+00 | −1.7029E+00 | 1.8196E−01 | 1.4050E−01 | 2.1840E−01 |
| A10 = | 6.2072E−01 | 2.0284E+00 | 1.6718E+00 | −7.7985E−01 | 1.8712E−02 | −1.3231E−01 |
| A12 = | −3.5856E−01 | −9.1734E−01 | −1.0763E+00 | 6.4070E−01 | −1.6464E−01 | −1.9582E−02 |
| A14 = | — | — | 2.4210E−01 | −2.0088E−01 | 1.1954E−01 | 7.2575E−02 |

TABLE 14-continued

| | Aspheric Coefficients | | | | | |
|---|---|---|---|---|---|---|
| Surface # | 8 | 9 | 10 | 11 | 12 | 13 |
| k = | −4.4692E−01 | −1.0000E+01 | −1.0000E+01 | −1.0000E+01 | −4.2816E+00 | −9.3609E−01 |
| A4 = | −1.3907E−01 | −1.4100E−01 | 8.0163E−02 | 1.4994E−01 | −1.6002E−01 | −2.0706E−01 |
| A6 = | 6.1620E−02 | 2.7450E−01 | −2.1557E−01 | −3.2984E−01 | 3.0103E−02 | 1.0031E−01 |
| A8 = | 3.9081E−01 | −2.3249E−01 | 1.4021E−01 | 3.0099E−01 | 1.8060E−02 | −4.2569E−02 |
| A10 = | −8.0759E−01 | 1.1530E−01 | −4.7159E−02 | −1.7283E−01 | −1.0316E−02 | 1.2860E−02 |
| A12 = | 6.2439E−01 | −3.2106E−02 | −6.8922E−03 | 6.0644E−02 | 2.2278E−03 | −2.4269E−03 |
| A14 = | −1.4730E−01 | 8.7458E−03 | 6.2297E−03 | −1.1465E−02 | −2.1312E−04 | 2.5022E−04 |
| A16 = | — | — | — | 8.7955E−04 | 3.9765E−06 | −1.0714E−05 |

In the 7th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 7th embodiment, so an explanation in this regard will not be provided again.

Moreover, these parameters can be calculated from Table 13 and Table 14 as the following values and satisfy the following conditions:

| 7th Embodiment | | | |
|---|---|---|---|
| f [mm] | 3.66 | f/f2 | 0.45 |
| Fno | 2.30 | |Pmax| | 0.77 |
| HFOV [deg.] | 37.1 | SD/Td | 0.96 |
| Nmax | 1.63 | Yc52 [mm] | 1.14 |
| V1/V2 | 0.99 | Yc62 [mm] | 1.49 |
| T23/T45 | 0.80 | Yc62/Td | 0.40 |
| (R9 + R10)/(R9 − R10) | 3.76 | TL/ImgH | 1.68 |
| f/R10 | 0.93 | FOV [deg.] | 74.2 |
| f/f1 | 0.35 | | |

The foregoing image capturing unit is able to be installed in, but not limited to, a mobile device, including smart phones, tablet personal computers and wearable apparatus. According to the present disclosure, both of the first lens element and the second lens element have positive refractive power so that it is favorable for distributing the refractive power nearing the object side more precisely to prevent the high-order spherical aberration from becoming too large. The image-side surface of the fifth lens element is concave and both of the object-side surface and the image-side surface of the fifth lens element are aspheric. Therefore, it is favorable for achieving better image quality in a limited amount of space. Furthermore, the fifth lens element has negative refractive power so that it is favorable for decreasing the back focal length and miniaturizing the photographing optical lens assembly.

The foregoing description, for purpose of explanation, has been described with reference to specific embodiments. It is to be noted that TABLES 1-14 show different data of the different embodiments; however, the data of the different embodiments are obtained from experiments. The embodiments were chosen and described in order to best explain the principles of the disclosure and its practical applications, to thereby enable others skilled in the art to best utilize the disclosure and various embodiments with various modifications as are suited to the particular use contemplated. The embodiments depicted above and the appended drawings are exemplary and are not intended to be exhaustive or to limit the scope of the present disclosure to the precise forms disclosed. Many modifications and variations are possible in view of the above teachings.

What is claimed is:

1. A photographing optical lens assembly comprising, in order from an object side to an image side:
   a first lens element with positive refractive power having an object-side surface being convex in a paraxial region thereof and an image-side surface being concave in a paraxial region thereof;
   a second lens element having positive refractive power;
   a third lens element;
   a fourth lens element;
   a fifth lens element with negative refractive power having an image-side surface being concave in a paraxial region thereof, wherein both of an object-side surface and the image-side surface of the fifth lens element are aspheric; and
   a sixth lens element having an image-side surface being concave in a paraxial region thereof, wherein both of an object-side surface and the image-side surface of the sixth lens element are aspheric, and the image-side surface of the sixth lens element has at least one inflection point;
   wherein the photographing optical lens assembly has a total of six lens elements, there is an air gap in a paraxial region between any two of the first lens element, the second lens element, the third lens element, the fourth lens element, the fifth lens element and the sixth lens element that are adjacent to each other, a focal length of the photographing optical lens assembly is f, a focal length of the second lens element is f2, a curvature radius of the image-side surface of the fifth lens element is R10, an axial distance between the object-side surface of the first lens element and an image plane is TL, a maximum image height of the photographing optical lens assembly is ImgH, and the following conditions are satisfied:

$0.20 < f/R10;$ $TL/ImgH < 2.0;$ and $0.07 < f/f2.$

2. The photographing optical lens assembly of claim 1, wherein the focal length of the photographing optical lens assembly is f, the curvature radius of the image-side surface of the fifth lens element is R10, and the following condition is satisfied:

$0.40 < f/R10.$

3. The photographing optical lens assembly of claim 1, wherein the focal length of the photographing optical lens assembly is f, the focal length of the second lens element is f2, and the following condition is satisfied:

$0.25 < f/f2.$

4. The photographing optical lens assembly of claim 1, wherein an Abbe number of the first lens element is V1, an Abbe number of the second lens element is V2, and the following condition is satisfied:

$$0.7 < V1/V2 < 1.3.$$

5. The photographing optical lens assembly of claim 1, wherein a maximal field of view of the photographing optical lens assembly is FOV, and the following condition is satisfied:

$$70[\deg.] < FOV < 100[\deg.].$$

6. The photographing optical lens assembly of claim 1, wherein the object-side surface of the sixth lens element is convex in a paraxial region thereof, and the object-side surface of the sixth lens element has at least one concave shape in an off-axis region thereof.

7. The photographing optical lens assembly of claim 1, wherein the object-side surface of the fifth lens element is convex in a paraxial region thereof, and the object-side surface of the fifth lens element has at least one concave shape in an off-axis region thereof.

8. The photographing optical lens assembly of claim 1, wherein a vertical distance between a non-axial critical point on the image-side surface of the fifth lens element and the optical axis is Yc52, a vertical distance between a non-axial critical point on the image-side surface of the sixth lens element and the optical axis is Yc62, and the following condition is satisfied:

$$Yc52 < Yc62.$$

9. The photographing optical lens assembly of claim 1, wherein the focal length of the photographing optical lens assembly is f, a focal length of the first lens element is f1, the focal length of the second lens element is f2, a focal length of the third lens element is f3, a focal length of the fourth lens element is f4, a focal length of the fifth lens element is f5, a focal length of the sixth lens element is f6, and the following condition is satisfied:

$$|P\max| = \max(|f/fi|, i=1,2,3,4,5,6); \text{ and}$$

$$|P\max| < 1.0.$$

10. The photographing optical lens assembly of claim 1, wherein an object-side surface of the fourth lens element is concave in a paraxial region thereof, and an image-side surface of the fourth lens element is convex in a paraxial region thereof.

11. The photographing optical lens assembly of claim 1, wherein the third lens element has negative refractive power.

12. The photographing optical lens assembly of claim 1, further comprising a stop, an axial distance between the stop and the image-side surface of the sixth lens element is SD, an axial distance between the object-side surface of the first lens element and the image-side surface of the sixth lens element is Td, and the following condition is satisfied:

$$0.75 < SD/Td < 1.2.$$

13. An image capturing unit, comprising:
the photographing optical lens assembly of claim 1; and
an image sensor, wherein the image sensor is disposed on the image side of the photographing optical lens assembly.

14. A mobile device, comprising:
the image capturing unit of claim 13.

15. A photographing optical lens assembly comprising, in order from an object side to an image side:

a first lens element with positive refractive power having an object-side surface being convex in a paraxial region thereof;
a second lens element with positive refractive power having an object-side surface being convex in a paraxial region thereof;
a third lens element having refractive power;
a fourth lens element;
a fifth lens element with negative refractive power having an object-side surface being convex in a paraxial region thereof and an image-side surface being concave in a paraxial region thereof, wherein both of the object-side surface and the image-side surface of the fifth lens element are aspheric; and
a sixth lens element having an image-side surface being concave in a paraxial region thereof, wherein both of an object-side surface and the image-side surface of the sixth lens element are aspheric, and the image-side surface of the sixth lens element has at least one inflection point;
wherein the photographing optical lens assembly has a total of six lens elements, a focal length of the photographing optical lens assembly is f, a curvature radius of the image-side surface of the fifth lens element is R10, a focal length of the first lens element is f1, a maximal field of view of the photographing optical lens assembly is FOV, and the following conditions are satisfied:

$$0.0 < f/R10;$$

$$f/f1 < 0.70; \text{ and}$$

$$70[\deg.] < FOV < 100[\deg.].$$

16. The photographing optical lens assembly of claim 15, wherein the first lens element has an image-side surface being concave in a paraxial region thereof.

17. The photographing optical lens assembly of claim 15, wherein the second lens element has an image-side surface being concave in a paraxial region thereof.

18. The photographing optical lens assembly of claim 15, wherein a vertical distance between a non-axial critical point on the image-side surface of the sixth lens element and the optical axis is Yc62, an axial distance between the object-side surface of the first lens element and the image-side surface of the sixth lens element is Td, and the following condition is satisfied:

$$0.20 < Yc62/Td < 0.70.$$

19. The photographing optical lens assembly of claim 15, wherein a curvature radius of the object-side surface of the fifth lens element is R9, the curvature radius of the image-side surface of the fifth lens element is R10, and the following condition is satisfied:

$$1.0 < (R9+R10)/(R9-R10).$$

20. The photographing optical lens assembly of claim 15, wherein an Abbe number of the first lens element is V1, an Abbe number of the second lens element is V2, and the following condition is satisfied:

$$0.7 < V1/V2 < 1.3.$$

21. The photographing optical lens assembly of claim 15, wherein each of the first lens element, the second lens element, the third lens element, the fourth lens element, the fifth lens element and the sixth lens element has a refractive index, a maximum refractive index among the first lens element, the second lens element, the third lens element, the fourth lens element, the fifth lens element and the sixth lens element is Nmax, and the following condition is satisfied:

$Nmax < 1.7$.

22. The photographing optical lens assembly of claim 21, wherein the fourth lens element has positive refractive power.

23. The photographing optical lens assembly of claim 21, wherein an axial distance between the second lens element and the third lens element is T23, an axial distance between the fourth lens element and the fifth lens element is T45, and the following condition is satisfied:

$0.4 < T23/T45$.

* * * * *

UNITED STATES PATENT AND TRADEMARK OFFICE
CERTIFICATE OF CORRECTION

PATENT NO. : 9,277,152 B2  
APPLICATION NO. : 14/324631  
DATED : March 1, 2016  
INVENTOR(S) : Hsin-Hsuan Huang It is certified that error appears in the above-identified patent and that said Letters Patent is hereby corrected as shown below:

Claims

Column 32, line 7, i.e., line 9 of claim 15: replace "a third lens element having refractive power" with --a third lens element--

Signed and Sealed this
Tenth Day of May, 2016

Michelle K. Lee
*Director of the United States Patent and Trademark Office*